US006256508B1

(12) United States Patent
Nakagawa et al.

(10) Patent No.: US 6,256,508 B1
(45) Date of Patent: Jul. 3, 2001

(54) SIMULTANEOUS BROADCASTING SYSTEM, TRANSMITTER AND RECEIVER THEREFOR

(75) Inventors: Masao Nakagawa, Kanagawa; Atsumi Koyama, Tokyo; Satoru Oonaka, Tokyo; Masanori Abe, Tokyo; Masashi Oguchi, Tokyo; Masashi Mori, Tokyo, all of (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/192,511

(22) Filed: Nov. 17, 1998

(30) Foreign Application Priority Data

Feb. 27, 1998 (JP) .......... 10-048257

(51) Int. Cl.[7] .......... H04B 15/00; H04B 7/015

(52) U.S. Cl. .......... 455/503; 455/502; 455/67.3; 455/67.6; 375/260; 370/208; 370/478

(58) Field of Search .......... 455/502, 503, 455/67.1, 67.3, 67.6; 370/203, 208, 478; 375/260; 348/21

(56) References Cited

U.S. PATENT DOCUMENTS

| | | | | |
|---|---|---|---|---|
| 4,255,814 | * | 3/1981 | Osborn | 455/503 |
| 4,506,384 | * | 3/1985 | Lucas | 455/503 |
| 4,718,109 | * | 1/1988 | Breeden et al. | 455/503 |
| 5,729,825 | * | 3/1998 | Kostreski et al. | 455/3.1 |
| 5,852,612 | * | 12/1998 | Kostreski et al. | 370/537 |
| 6,005,605 | * | 12/1999 | Kostreski et al. | 348/21 |

OTHER PUBLICATIONS

Pheeradej Nanan et al., "Spiral Vector Therapy of AC Circuits and Machine," *The Institute of Electronics, Information and Communication Engineers*, Technical Report of IEICE, SST97–75, SANE97–100, Dec. 11, 1997, pp. 7–10.

* cited by examiner

*Primary Examiner*—Nay Maung
*Assistant Examiner*—Temica M. Davis
(74) *Attorney, Agent, or Firm*—Burns, Doane, Swecker & Mathis, LLP

(57) ABSTRACT

A simultaneous broadcasting system, a transmitter, and a receiver therefor use a first frequency bandwidth for a wide area broadcasting and a second frequency bandwidth for a local area broadcasting obtained by dividing a frequency bandwidth of one broadcasting channel. In the simultaneous broadcasting system, a same program for the wide area broadcasting is transmitted based on an OFDM modulation method by using the first frequency bandwidth and a different program for each local area station is transmitted by using a different spreading code allocated for each local are station based on a SS modulation method.

13 Claims, 16 Drawing Sheets

RADIO WAVE ZONES OF BROADCASTING STATIONS

SIMULTANEOUS BROADCASTING SYSTEM, TRANSMITTER AND RECEIVER THEREFOR

BACKGROUND OF THE INVENTION

1. Field of the Invention

The present invention relates to a simultaneous broadcasting system of broadcasting radio waves from a wide area broadcasting and local area broadcastings simultaneously, and transmitter and receivers for transmitting and receiving radio wave based on the simultaneous broadcasting system.

2. Description of the Prior Art

FIG. 1 is a diagram showing broadcasting radio wave zones as broadcasting areas transmitted from each broadcasting stations. The broadcasting area are overlapped as designated by slant lines. In FIG.1, the reference character A designates a broadcasting station for broadcasting over wide area, and the reference characters B, C, D, E, F, and G denote local broadcasting stations for local areas. The reference characters a, b, c, d, e, f, and g indicate radio wave broadcasting zones of radio waves transmitted from the wide area broadcasting station and the local area broadcasting stations. These broadcasting radio wave zones are overlapped to each other in adjacent areas designated by the slant lines shown in FIG. 1.

FIG. 2 is a diagram showing the possible allocation map in a conventional broadcasting frequency bandwidth for the wide area broadcasting station A and the local area broadcasting stations B, C, D, E, F, and G. In FIG. 2, the reference character fA designates the broadcasting frequency bandwidth of 6 MHz of each channel allocated for the wide area broadcasting station A. Each of the reference characters fB, fC, . . . , and fG denotes the broadcasting frequency bandwidth of 6 MHz of each channel allocated for each of the local area broadcasting stations B, C, . . . , and G.

Next, a description will be given of the conventional broadcasting system.

The wide area broadcasting station A uses the broadcasting frequency bandwidth fA and transmits a wide area broadcasting program into the radio wave zone a. The local area broadcasting stations B, C, D, E, F, and G receive the wide area broadcasting program from the wide area broadcasting station A through video information transmission service line, for example, and transmits local area broadcasting programs in addition to the received wide area broadcasting programs into each of the broadcasting radio wave zones b, c, d, e, f, and g by using each of the broadcasting frequency bandwidths fB, fC, fD, fE, fF, and fG, respectively.

In order to avoid occurrence of radio wave interference from adjacent areas, namely, in order to eliminate ghost caused when the wide area broadcasting station A and the local area broadcasting stations B to G transmit programs simultaneously, as shown in FIG. 2, it is required to allocate a different 6 MHz frequency bandwidth per broadcasting station. The case shown in FIG. 2 requires the wide broadcasting frequency bandwidth of 42 MHz.

FIG. 3 is a diagram showing the allocation map in a conventional frequency bandwidth based on the method Orthogonal Frequency Division Multiplexing (OFDM). The OFDM method has been used for Digital Audio Broadcasting (DAB) service in Europe from 1996 and also adopted as a standard method of a next generation television broadcasting service by using terrestrial radio wave (VHF/UHF). This standard method is a digital modulation method to be also used for digital television broadcasting service in Japan.

The OFDM method is a multi carrier transmission method in which broadcasting signals to be transmitted are divided into a plurality of carrier waves. For example, as shown in FIG. 3, it is widely known that this OFDM method prevents occurrence of radio wave interference such as ghost so long as a same broadcasting program is transmitted even if the wide area broadcasting and local area broadcasting use the same channel of 6 MHz bandwidth.

On the other hand, there is a requirement to broadcast different particular programs such as particular local area commercial, election information, and the like in each local broadcasting station in addition to programs for the wide area broadcasting. When local area broadcasting stations use one channel simultaneously for different particular programs based on the OFDM method, broadcasting radio wave interference occurs in adjacent areas designated by the slant lines shown in FIG. 1 because the radio frequency spectrum of broadcasting signals transmitted from each local area broadcasting station is different to each other.

Because the conventional simultaneous broadcasting system has the configuration described above, it must be required to different frequency bandwidth for each broadcasting station, as shown in FIG. 2, in order to avoid occurrence of radio frequency interference. This causes to require a wide frequency bandwidth as a whole for the wide area broadcasting station and the local area broadcasting stations.

Furthermore, when the wide area broadcasting station broadcasts a wide area program and the local area broadcasting stations broadcast particular local area programs by using one broadcasting channel simultaneously, the radio frequency interference occurs in adjacent areas because broadcasting programs are different to each other.

There is a prior art technique "Japanese laid-open publication number JP-A-7/154350, Multi-broadcasting system and device therefor" relating to the present invention. This prior art technique can not broadcast different sub broadcastings in local area broadcasting stations since sub-broadcasting programs are transmitted only when local area information added to sub-broadcasting information multiplied with wide area broadcasting information by the broadcasting station as a transmitter is equal to particular local area information set in receivers.

SUMMARY OF THE INVENTION

Accordingly, an object of the present invention is, with due consideration to the drawbacks of the conventional technique, to provide a simultaneous broadcasting system, a broadcasting transmitter, and a broadcasting receiver therefor. Further, the present invention is capable of avoiding occurrence of interference of broadcasting radio wave signals in adjacent areas even if each of broadcasting stations broadcasts different programs for wide area broadcasting and local area broadcastings by using a same broadcasting channel.

In accordance with a preferred embodiment of the present invention, a simultaneous broadcasting system in which a plurality of broadcasting stations broadcast a same program as a wide area broadcasting and each of said broadcasting stations broadcasts a different program as a local area broadcasting by using one broadcasting channel, simultaneously, comprises dividing a frequency bandwidth of said broadcasting channel into a first frequency bandwidth for said wide area broadcasting and a second frequency bandwidth for said local area broadcasting, and modulating signals of said same program for said wide area broadcasting in said first frequency bandwidth based on an Orthogonal Frequency Division Multiplex (OFDM) method, and signals of said different program in said second frequency bandwidth based on a Spread Spectrum (SS) method by using different spreading codes corresponding to said local area broadcasting stations.

In the simultaneous broadcasting system as another preferred embodiment of the present invention, said second frequency bandwidth for said local area broadcasting is used for data transmission transmitted from each of said plurality of broadcasting stations.

In the simultaneous broadcasting system as another preferred embodiment of the present invention, a different spreading code is allocated for each user contracted with each station of said plurality of broadcasting stations, and said second frequency bandwidth for said local area broadcasting is used for a down link in a two-way communication between said each broadcasting and said each user.

In the simultaneous broadcasting system as another preferred embodiment of the present invention, a broadcasting area of each of at least one or more said broadcasting stations is divided into a plurality of sectors, and each broadcasting station broadcasts different programs to each sector by using different spreading codes corresponding to each sector based on said SS method.

In the simultaneous broadcasting system as another preferred embodiment of the present invention, said second frequency bandwidth allocated for said local area broadcasting is further divided into a plurality of sub-frequency bandwidth, and each broadcasting station broadcasts a different local area broadcasting program based on a Frequency Division Multiple Access (FDMA) method in each of said plurality of sub-frequency bandwidth allocated for each broadcasting station.

In the simultaneous broadcasting system as another preferred embodiment of the present invention, said second frequency bandwidth allocated for said local area broadcasting is further divided based on a Time Division Multiplex Access (TDMA), and each broadcasting station broadcasts a different local area broadcasting program based on said TDMA method.

In accordance with another preferred embodiment of the present invention, a broadcasting transmitter for transmitting a same program as a wide area broadcasting from a plurality of broadcasting stations and a different program as a local area broadcasting from one of said plurality of broadcasting stations by using one broadcasting channel, simultaneously, comprises an Orthogonal Frequency Division Multiplex (OFDM) modulator for modulating broadcasting signals, based on a OFDM modulation method, for said wide area broadcasting in a first frequency bandwidth obtained by dividing a frequency bandwidth of said broadcasting channel, a Spread Spectrum (SS) modulator for modulating signals for said local area broadcasting by using a different spreading code allocated corresponding to each of said broadcasting stations based on a SS modulation method in a second frequency bandwidth obtained by dividing said frequency bandwidth of said broadcasting channel, and a frequency synthesizer for synthesizing signals from said OFDM modulator and signals from said SS modulator and for outputting synthesized signals.

In the broadcasting transmitter as another preferred embodiment of the present invention, said SS modulator comprises a plurality of SS modulators for modulating said signals for said local area broadcasting, said frequency synthesizer, for synthesizing said signals from said wide area broadcasting and said signal from said local area broadcasting corresponding to each broadcasting station, comprises a plurality of frequency synthesizer, each frequency synthesizer is formed corresponding to each of said plurality of SS modulators, and further comprises a plurality of directional antennas, and wherein each directional antenna corresponds to a pair of each SS modulator and each frequency synthesizer.

In the broadcasting transmitter as another preferred embodiment of the present invention, a Frequency Division Multiple Access (FDMA) modulator is incorporated instead of said SS modulator, wherein said OFDM modulator modulates said signals for said local area broadcasting by using one of a plurality of sub-broadcasting frequency bandwidths obtained by dividing said second frequency bandwidth allocated for each of said plurality of broadcasting stations.

In the broadcasting transmitter as another preferred embodiment of the present invention, a Time Division Multiple Access (TDMA) modulator is incorporated instead of said SS modulator, wherein said TDMA modulator modulates said signals for said local area broadcasting based on a Time Division Multiple Access (TDMA) method in said second frequency bandwidth.

In accordance with another preferred embodiment of the present invention, a broadcasting receiver for receiving a same program as a wide area broadcasting from a plurality of broadcasting stations and a different program as a local area broadcasting from one of said plurality of broadcasting stations by using one broadcasting channel, simultaneously, comprises a frequency divider for dividing broadcasting signals of said wide area broadcasting and said local area broadcasting transmitted through said broadcasting channel into signals on a first frequency bandwidth and a second frequency bandwidth, an Orthogonal Frequency Division Multiplex (OFDM) demodulator for demodulating said signals on said first frequency bandwidth based on a OFDM demodulation method, and a Spread Spectrum (SS) demodulator for demodulating said signals on said second frequency bandwidth by using a different spreading code allocated corresponding to each of said plurality of broadcasting stations based on a SS demodulation method.

In the broadcasting receiver as another preferred embodiment of the present invention, a Frequency Division Multiple Access (FDMA) demodulator is incorporated instead of said SS demodulator, wherein said OFDM demodulator demodulates said signals for said local area broadcasting by using one of a plurality of sub-broadcasting frequency bandwidths obtained by dividing said second frequency bandwidth allocated for each of said plurality of broadcasting stations.

In the broadcasting receiver as another preferred embodiment of the present invention, a Time Division Multiple Access (TDMA) demodulator is incorporated instead of said SS demodulator, wherein said TDMA demodulator demodulates said signals for said local area broadcasting based on a Time Division Multiple Access (TDMA) method in said second frequency bandwidth.

BRIEF DESCRIPTION OF THE DRAWINGS

These and other objects, features, aspects and advantages of the present invention will become more apparent from the following detailed description of the present invention when taken in conjunction with the accompanying drawings, in which.

DESCRIPTION OF THE PREFERRED EMBODIMENTS

Other features of this invention will become apparent through the following description of preferred embodiments which are given for illustration of the invention and are not intended to be limiting thereof.

First Embodiment

Figure 4:
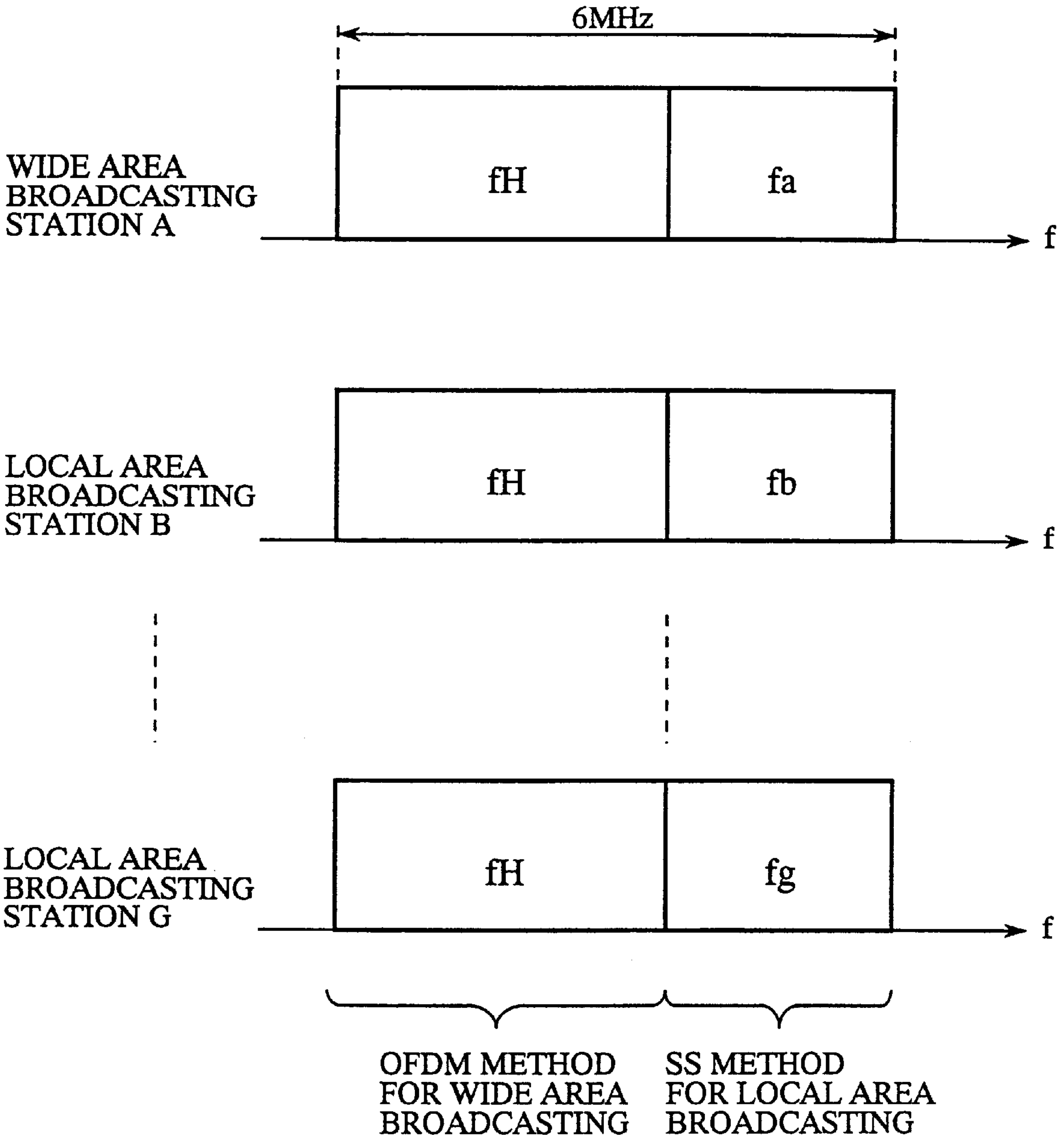
FIG. 4 is a diagram showing an allocation map of the frequency band to be used in the simultaneous broadcasting system as the first embodiment according to the present invention.

FIG. 4 is a diagram showing an allocation map of the frequency band to be used in the simultaneous broadcasting system as the first embodiment according to the present invention. In the simultaneous broadcasting system according to the present invention shown in FIG. 4, the broadcasting frequency bandwidth of 6 MHz allocated for a broadcasting channel is divided into two parts, a frequency bandwidth fH and a broadcasting frequency bandwidth fa, fb, . . . , or fg. Each of the wide area broadcasting station A and the local area broadcasting stations B C, . . . , and G broadcasts a same program by using this frequency bandwidth fH and each of the broadcasting stations A, B, C, . . . , and G broadcasts a different particular program by using this frequency bandwidth fa, fb, . . . , and fh.

Figure 1:
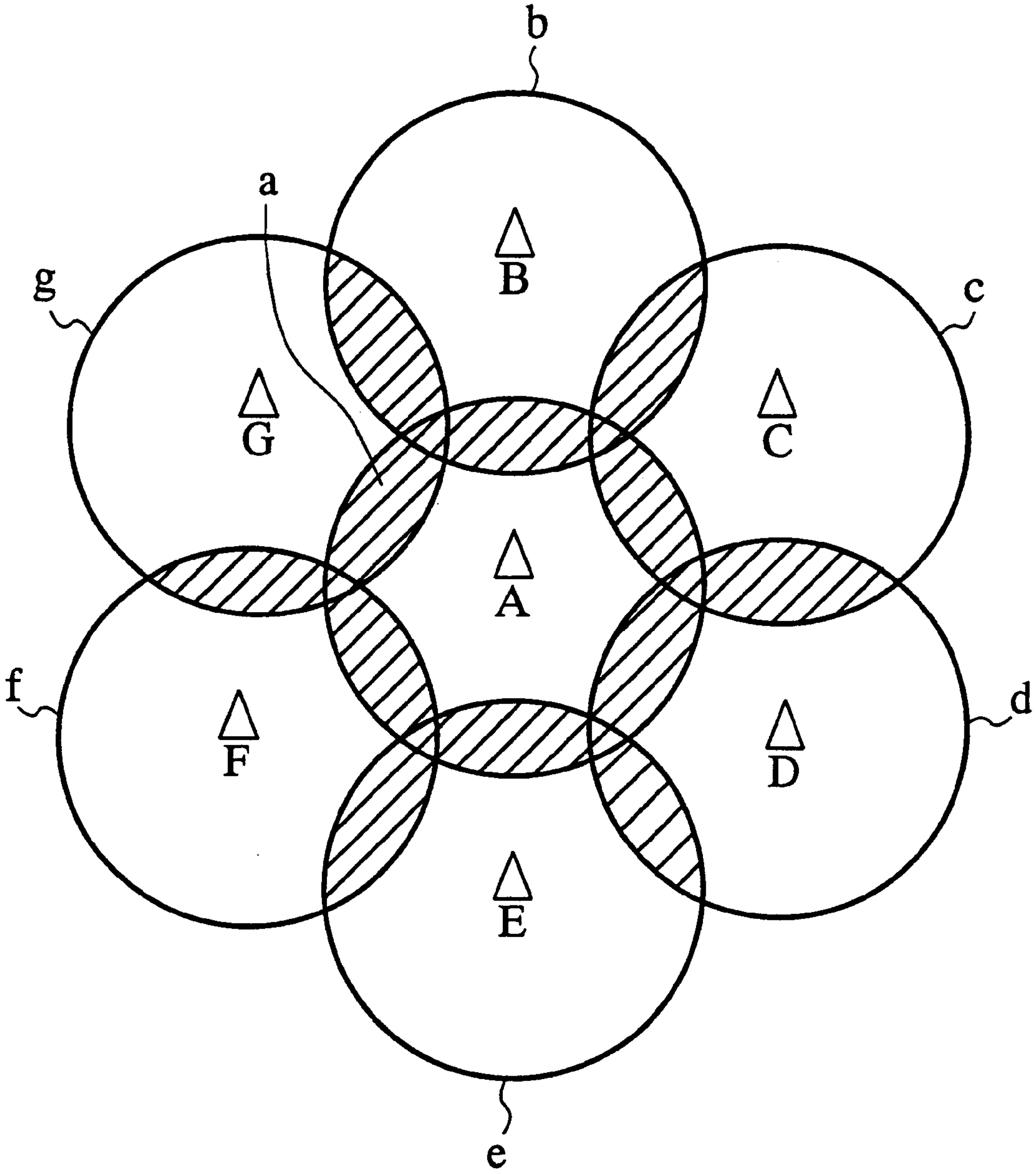
FIG. 1 is a diagram showing broadcasting radio wave zones transmitted from each broadcasting stations.
Figure 2:
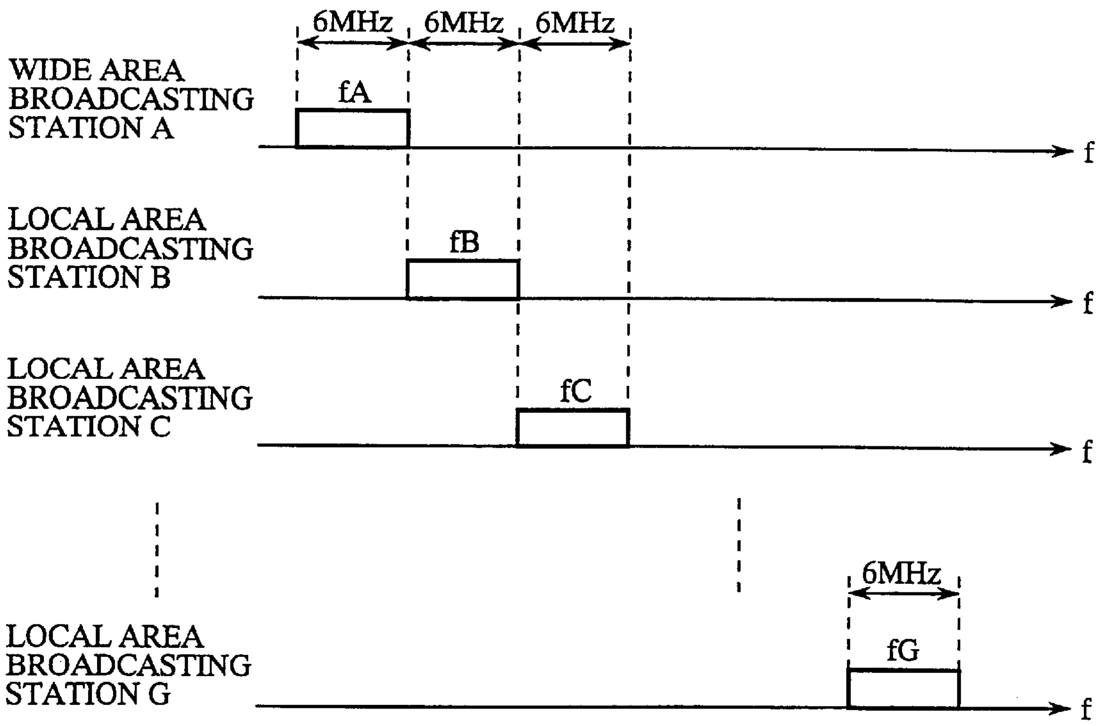
FIG.2 (PRIOR ART)
FIG. 2 is a diagram showing a possible allocation map in a conventional broadcasting frequency bandwidth for the wide area broadcasting stations A and the local area broadcasting stations B, C, D, E, F, and G.
Figure 3:
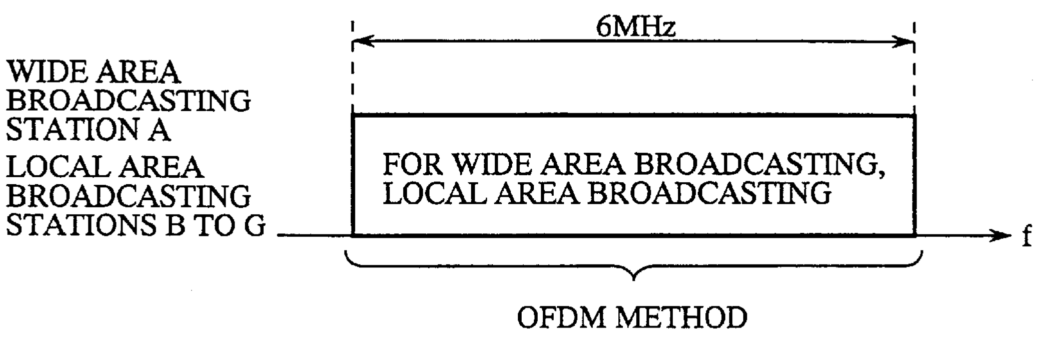
FIG.3 (PRIOR ART)
FIG. 3 is a diagram showing the allocation map in a conventional frequency bandwidth based on the method OFDM.

In the simultaneous broadcasting system according to the present invention, the method OFDM (Orthogonal Frequency Division Multiplexing) is used as a modulation method for the wide area broadcasting and the Spread Spectrum (SS) method is applied as another modulation method for each local area broadcasting with a different Spread Spectrum code (a different SS code). That is, in order to avoid occurrence of interference of the radio wave signals in adjacent areas in the broadcasting zones of the broadcasting stations, the same broadcasting program signals for the wide area broadcasting are transmitted based on the OFDM modulation method, that is capable of preventing occurrence of interference in adjacent areas designated by the slant lines shown in FIG. 1, by using the frequency bandwidth fH, and different broadcasting program signals for each local area broadcasting are transmitted based on the SS modulation method by using a different spreading code.

There is a Direct Sequence (DS) method for performing a direct spreading and a frequency hopping (FH) method for performing a frequency spreading as the SS modulation method. In general, the CDMA (Code Division Multiple Access) method is widely used as the DS method. The SS method may receive broadcasting signals without occurrence of interference caused between broadcasting radio waves from other broadcasting stations only when both a transmitter and a receiver use a same spreading code even if different broadcasting stations broadcast different programs by using a same frequency bandwidth.

Figure 5B:
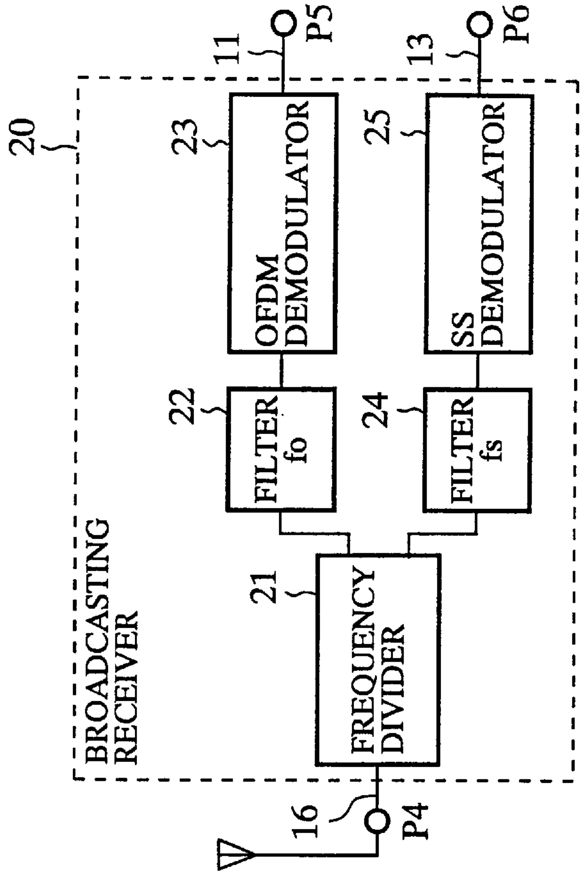
FIGS. 5A and 5B are diagrams showing a configuration of a broadcasting transmitter and a broadcasting receiver to be used for the simultaneous broadcasting system as the first embodiment according to the present invention.
Figure 5A:
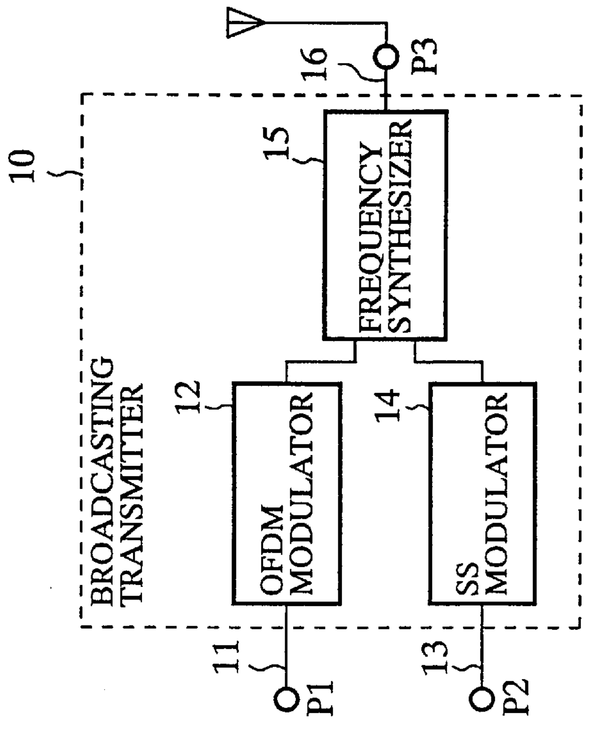

FIG. 5A is a diagram showing a configuration of a broadcasting transmitter to be used in the simultaneous broadcasting system as the first embodiment according to the present invention. In FIG. 5A, the reference number 10 designates the broadcasting transmitter to be used for the simultaneous broadcasting system as the first embodiment. The reference character P1 denotes an input terminal through which wide area broadcasting signals 11 are received. The reference character P2 indicates an input terminal through which local area broadcasting signals 13 are received. The reference number 12 designates an OFDM (Orthogonal Frequency Division Multiplexing) modulator for modulating the wide area broadcasting signals 11. The reference number 14 indicates a SS (Spread Spectrum) modulator for modulating the local area broadcasting signals 13 by using different spreading codes. The reference number 15 designates a frequency synthesizer for synthesizing output from the OFDM modulator 12 and output from SS modulator 14. The reference number 16 designates a broadcasting signal to be transmitted to a broadcasting zone through an output terminal P3 and an antenna incorporated in the broadcasting transmitter 10.

FIG. 5B is a diagram showing a configuration of a broadcasting receiver to be used in the simultaneous broadcasting system as the first embodiment according to the present invention. In FIG. 5B, the reference number 20 designates the broadcasting receiver for receiving the broadcasting radio wave signals transmitted from the broadcasting transmitter 10. The reference character P4 denotes an input terminal through which the broadcasting radio wave signals 16 are received. The reference number 21 indicates a frequency divider for dividing the broadcasting radio wave signals 16 into a signal component in the frequency bandwidth fo for the wide area broadcasting and a signal component in the frequency bandwidth fs for the local area broadcasting. The reference number 22 designates a filter fo through which the signal component in the frequency bandwidth fo is passed. The reference number 24 denotes a filter fs through which the signal component in the frequency bandwidth fs is passed. The reference number 23 indicates an OFDM demodulator for demodulating the signal component in the frequency bandwidth fo for the wide area broadcasting. The reference number 25 indicates a SS demodulator for demodulating the signal component in the frequency bandwidth fs for the local area broadcasting. The reference character P5 designates an output terminal for the wide area broadcasting signals 11. The reference character P6 denotes an output terminal for the local area broadcasting signals 13.

Figure 6:
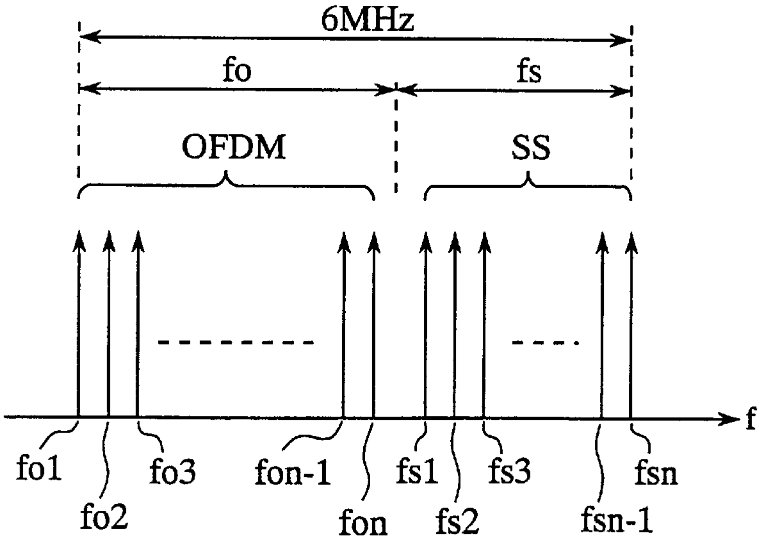
FIG. 6 is a diagram showing a carrier frequency distribution to be used in the OFDM method and SS method in the simultaneous broadcasting system as the first embodiment according to the present invention.

FIG. 6 is a diagram showing a carrier frequency distribution to be used in the OFDM method and the SS method in the simultaneous broadcasting system as the first embodiment according to the present invention. FIG. 6 shows the distribution of carrier frequencies fo1, fo2, fo3, . . . , fo(n−1), and fon (n is a positive integer) in the frequency bandwidth fo allocated for the OFDM method and also shows the distribution of carrier frequencies fsl, fs2, fs3, . . . , fs(n−1), and fsn in the frequency bandwidth fs allocated for the SS method.

Next, a description will be given of the operation of the broadcasting transmitter 10 and the receiver 20 as the first embodiment.

The OFDM modulator 12 in the broadcasting transmitter 10 shown in FIG. 5A performs a code modulation for the digital signals 11 for the wide area broadcasting based on the OFDM method and performs a frequency modulation by using the carrier frequencies fo1, fo2, fo3, . . . , and fon shown in FIG. 6, and then transmits modulated signals to the frequency synthesizer 15. On the other hand, the SS modulator 14 in the broadcasting transmitter 10 performs a code modulation for the digital signals 13 for the local area broadcasting, performing a frequency modulation by using the carrier frequencies fs1, fs2, fs3, . . . , and fsn shown in FIG. 6, and transmits the modulated signals into the frequency synthesizer 15.

The frequency synthesizer 15 performs a frequency synthesis of the modulated signals for the wide area broadcasting modulated by the OFDM modulator 12 and the modulated signals for the local area broadcasting modulated by the SS modulator 14 and the transmits the synthesized signals to the output terminal P13 in the broadcasting transmitter 10 as the broadcasting carrier signals 16.

The broadcasting receiver 20 receives the broadcasting signals 16 transmitted from the transmitter 10 through the input terminal P4. The frequency divider 21 divides the received signals into modulated signals for the wide area broadcasting and modulated signals for the local area broadcasting, and transfers both the divided signals to the filter (fo) 22 and the filter (fs) 24, respectively.

The OFDM demodulator 23 performs a demodulation, that is the reverse operation of the modulation of the OFDM modulator 12, for the divided signals for the wide area broadcasting transferred from the divider 21 through the filter (fo) 22, and outputs the demodulated signals as the wide area broadcasting signal in digital through the output terminal P5.

The SS demodulator 25 perform a demodulation, that is the reverse operation of the modulation of the SS modulator 14, for the divided signals for the local area broadcasting transferred from the frequency divider 21 through the filter (fs) 24, and outputs the demodulated signals as the local area broadcasting signal in digital through the output terminal P6.

It is possible to eliminate both the filters 22 and 24 from the broadcasting receiver 20 having the configuration shown in FIG. 5B.

As described above, the broadcasting transmitter 10 in the broadcasting station transmits the wide area broadcasting program and the local area broadcasting program, and the broadcasting receiver 20 receives both the programs from the transmitter 10 and outputs the wide area broadcasting program through the output terminal P5 and the local area broadcasting program through the output terminal P6. Thereby, users may select and watch one of the programs on a screen or both programs on multi-screens simultaneously.

Figure 7:
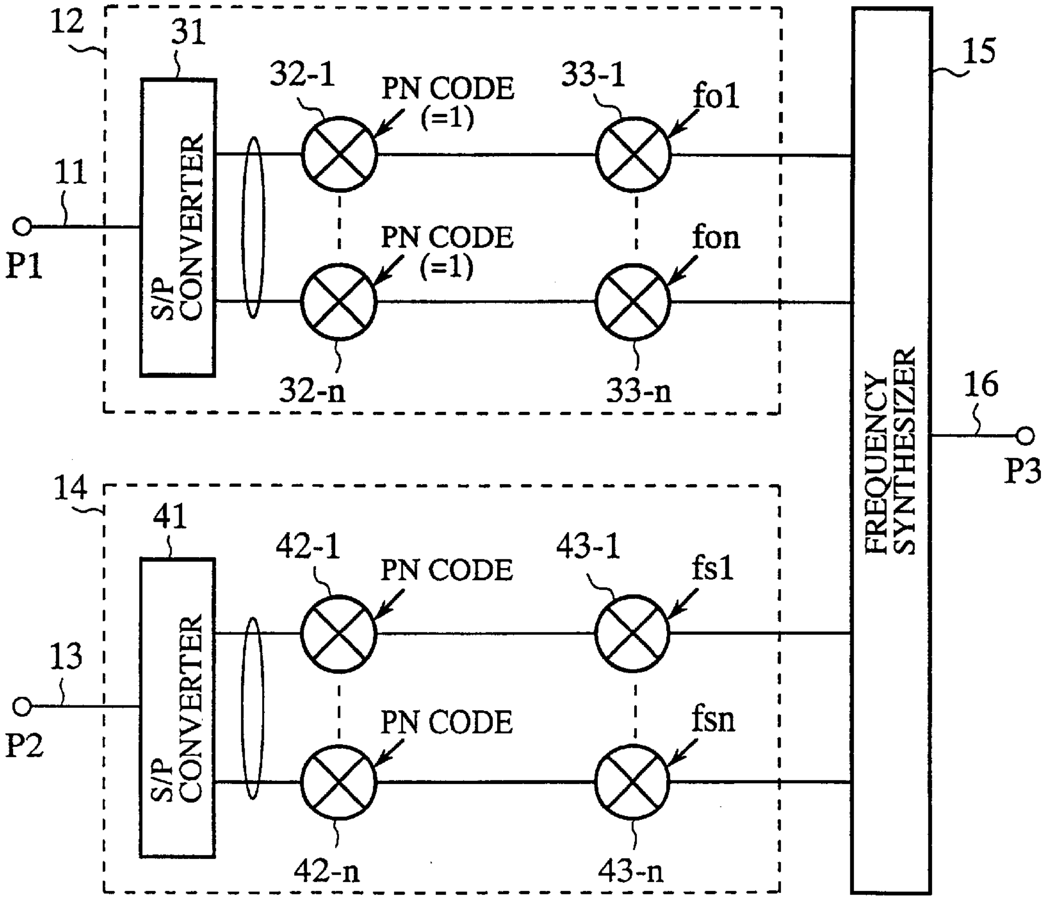
FIG. 7 is a diagram showing a detailed configuration of the broadcasting transmitter shown in FIG. 5A.

FIG. 7 is a diagram showing a detailed configuration of the broadcasting transmitter 10 shown in FIG. 5A. In FIG. 7, the reference number 31 designates a serial/parallel converter (S/P converter) for converting serial signals of the wide area broadcasting signals into n parallel signals (n is a positive integer). The reference numbers 32-1, . . . , and 32-n denote code modulators for performing the code modulation by using Pseudorandom Noise (PN) codes (=1) as spreading codes. The reference numbers 33-1, . . . , and 33-n designate frequency modulators for performing the frequency modulation by using the carrier frequencies fo1, . . . , and fon. The OFDM modulator 12 comprises the S/P converter 31, the code modulators 32-1, . . . , and 32-n, and the frequency-modulators 33-1, . . . , and 33-n. The reference number 41 designates a serial/parallel converter (S/P converter) for converting serial signals of the local area broadcasting signals into n parallel signals (n is a positive integer). The reference numbers 42-1, . . . , and 42-n denote code modulators for performing the code modulation by using PN codes as spreading codes. The reference numbers 43-1, . . . , and 43-n designate frequency modulators for performing the frequency modulation by using the carrier frequencies fsl, . . . , and fsn. The SS modulator 14 comprises the S/P converter 41, the code modulators 42-1, . . . , and 42-n, and the frequency modulators 43-1, . . . , and 43-n. Other components shown in FIG. 7 are the same of the components shown in FIGS. 5A and 5B.

Next, a description will be given of the operation of the OFDM modulator 12 incorporated in the broadcasting transmitter 10.

The S/P converter 12 converts the input broadcasting signals 11 received through the input terminal P1 into n parallel signals. The code modulators 32-1, . . . , and 32-n perform the code modulation for the n parallel signals, respectively by using the PN code "1". That is, each of the code modulators 32-1, . . . , and 32-n outputs the parallel signal without any change because each of the code modulators 32-1, . . . , and 32-n multiplies the corresponding parallel signal by one. Further, each of the frequency modulators 33-1, . . . , and 33-n modulates each parallel signal provided from each of the code modulators 32-1, . . . , and 32-n by using the corresponding carrier frequency fo1, . . . , and fon. Thus, the code modulators 32-1, . . . , and 32-n may reduce the carrier interval as small as possible by modulating the whole carriers simultaneously by using a system of orthogonal functions. It is thereby possible or the code modulators 32-1, . . . , and 32-n to obtain the same frequency availability performance when comparing with the case sing a single carrier.

Next, a description will be given of the operation of the SS modulator 14.

The S/P converter 41 converts the broadcasting signal for the local area broadcasting received through the input terminal P2 into n parallel signals. The code modulators 42-1, . . . , and 42-n perform the code modulation for the n parallel signals by using PN codes as spreading codes. In the SS modulator 14 as the first embodiment shown in FIG. 7, each of the n parallel signals is multiplied by −1 or 1 as the PN codes randomly, so 1that the code modulators 42-1, . . . , and 42-n outputs the input signal without any changing or outputs the inverted value of the input signal. Then, each of the frequency modulators 43-1, . . . , and 43-n modulates each of the corresponding parallel signals transferred from each of the code modulators 42-1, . . . , and 42-n by using each of the carrier frequencies fs1, . . . , and fsn shown in FIG. 6, and outputs modulated one to the frequency synthesizer 15. Each different spreading code is applied to the code modulation performed by the frequency modulators 43-a, . . . , and 43-n for each broadcasting station.

Figure 8:
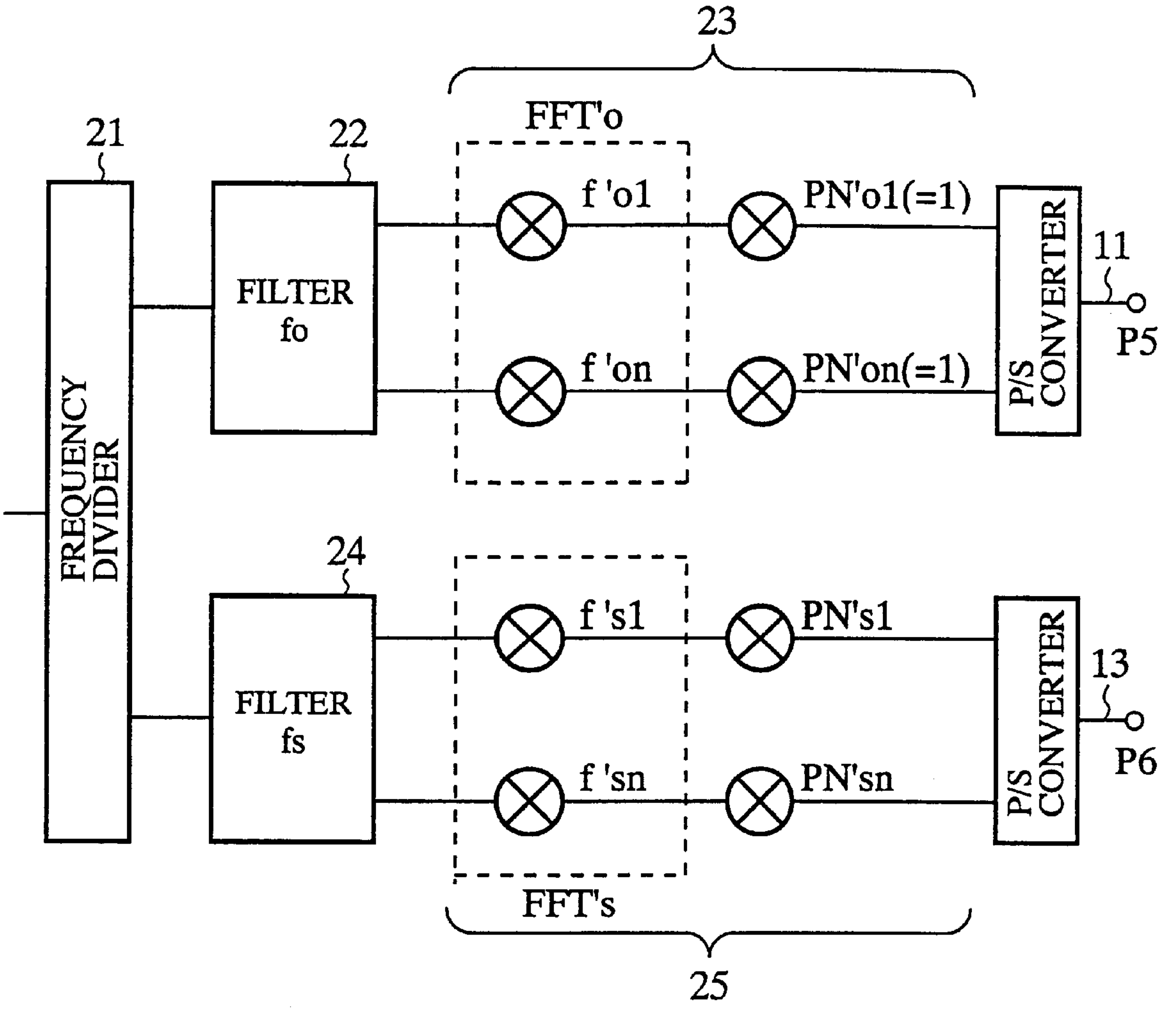
FIG. 8 is a diagram showing a detailed configuration of the broadcasting receiver shown in FIG. 5B.

FIG. 8 is a diagram showing a detailed configuration of the broadcasting receiver 20 shown in FIG. 5B. In FIG. 8, the reference number 21 designates a frequency divider. The reference number 22 and 24 denote a filter fo and a filter fs, respectively. The reference number 23 indicates the OFDM modulator. The reference number 25 designates the SS demodulator. Those components are the same of the components shown in FIG. 5B.

The OFDM demodulator 23 and the SS demodulator perform the reverse operation of the OFDM modulator 12 and the SS modulator 14 shown in FIG. 5A, so that the wide area broadcasting signals 11 and the local area broadcasting signals 13 are demodulated. Thus, because the broadcasting transmitter of the first embodiment broadcasts the local area broadcasting program that is different from the wide area broadcasting program by using the different spreading code per broadcasting station, it is possible to avoid occurrence of broadcasting signal interference in the adjacent areas designated by the slant lines shown in FIG. 1.

In the first embodiment, although the frequency bandwidth is used for particular local area programs such as local commercial and the like, it is also possible to transmit down loading data such as program software from the broadcasting transmitter 10 to the broadcasting receiver 20.

In addition, because the frequency bandwidth for the local area broadcasting may be also used for each user (namely, for each broadcasting receiver 20) having a particular spreading code that has been registered in advance, it is possible to use this frequency bandwidth for two-way communication between the broadcasting transmitter 10 and the broadcasting receiver 20. In this case, a telephone network is used as the up-link from users to the local area broadcasting station.

Next, a description will be given of another configuration of the simultaneous broadcasting system, a broadcasting transmitter, and a broadcasting receiver according to the first embodiment.

Figure 9:
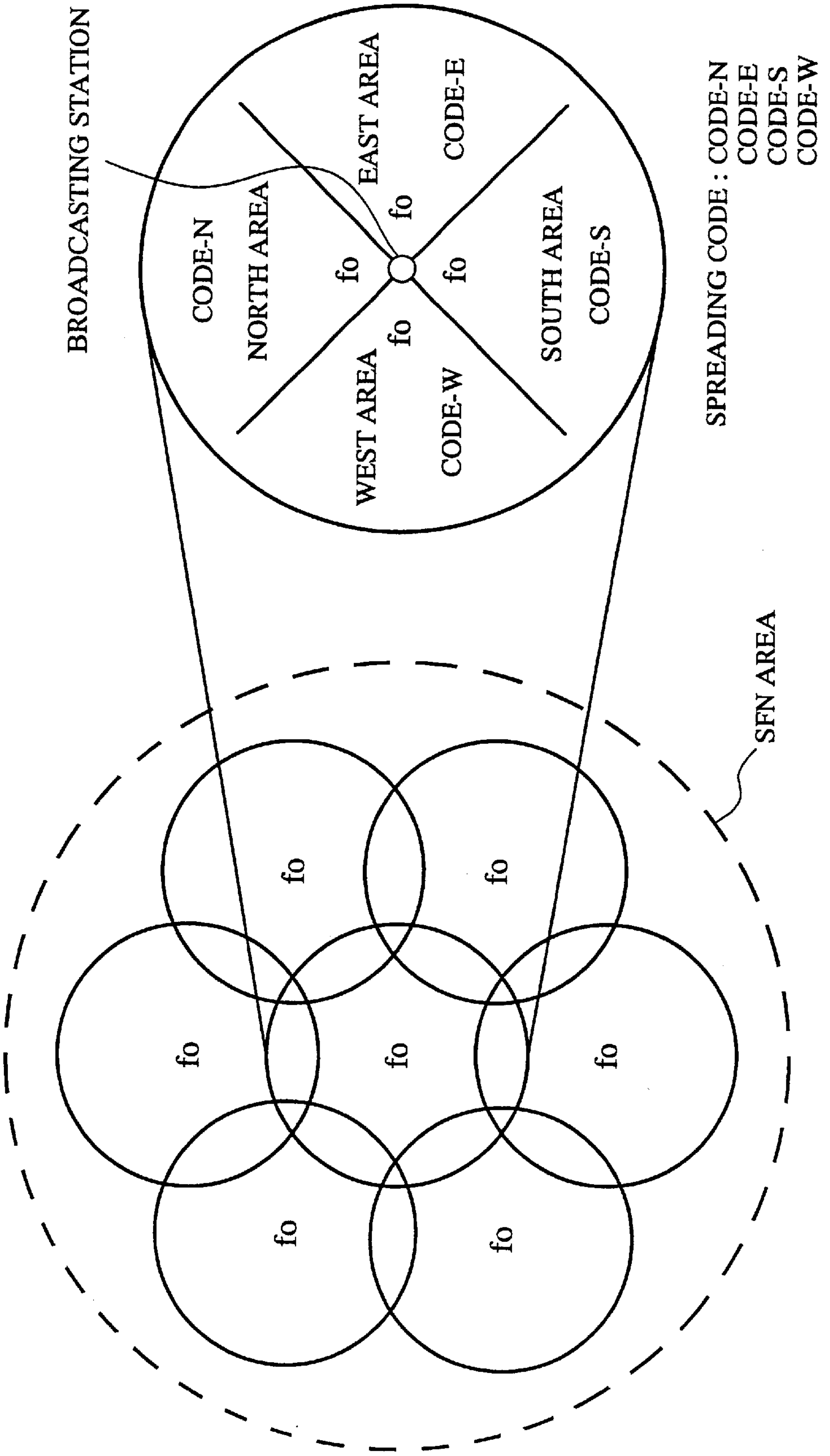
FIG. 9 is a diagram showing radio wave zones when one local area broadcasting area is divided into a plurality of sectors (For example, North area, East area, South area, and West area) and different broadcastings are performed for the sectors.

FIG. 9 is a diagram showing radio wave zones when one local area broadcasting zone is further divided into a plurality of sub-areas, for example into four sectors such as the North area, the East area, the South area, and the West area, and the broadcasting station transmits different broadcasting programs to the four sectors, the North area, the East area, the South area, and the West area.

In the above configuration of the simultaneous broadcasting system, each local broadcasting area is divided into a plurality of local sub-areas or sectors. For example, as shown in FIG. 9, one local area is divided into four local sub-areas (or four sectors), the North area, the East area, the South area, and the West area. The broadcasting transmitter is placed at the local broadcasting station located at the center of this broadcasting zone including the four sub-areas. This broadcasting transmitter has four directional transmission antennas for the broadcasting to the four sub-areas.

Figure 10:
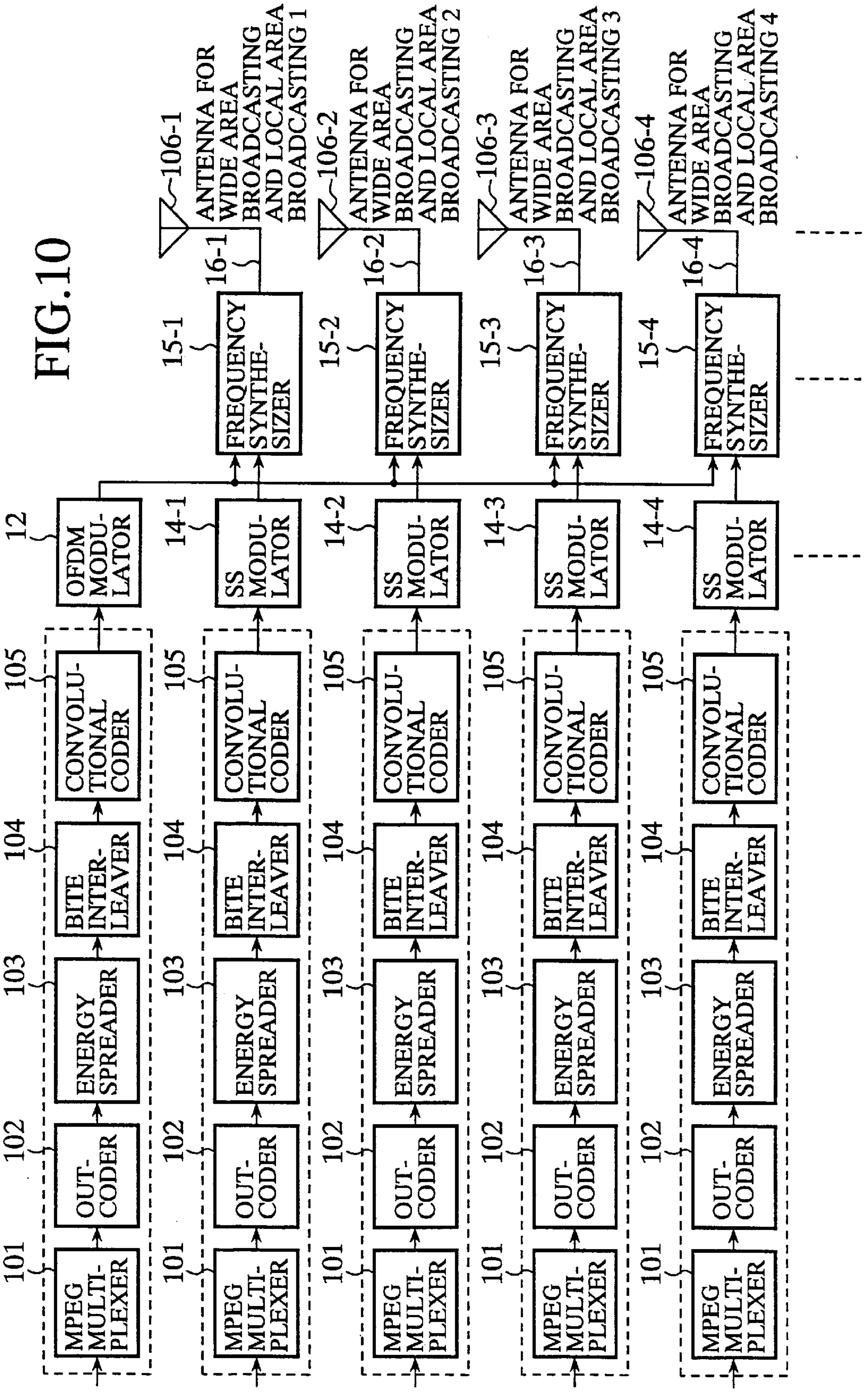
FIG. 10 is a diagram showing another configuration of the broadcasting transmitter as the first embodiment according to the present invention.

FIG. 10 is a diagram showing another configuration of the broadcasting transmitter as the first embodiment according to the present invention. In FIG. 10, the reference number 101 designates a Moving Picture Experts Group (MPEG) multiplexer, the reference number 102 indicates out coder that applies shorted Reed Solomon codes. The reference number 103 denotes an energy spreader performing an Exclusive logical OR operation for a pseudo random code sequence per bit. The reference number 104 indicates a byte interleaver using a convolutional code as energy spread transmission packets. The reference number 105 designates a convolutional coder using a punctured convolutional code. The reference numbers 14-1 to 14-n denote SS modulators corresponding to local area broadcastings 1 to 4, respectively and each SS modulator uses different particular spreading code. The reference numbers 15-1 to 15-4 indicate frequency synthesizers each corresponding to each of the sub-local broadcastings 1 to 4. In the configuration of the broadcasting transmitter shown in FIG. 4, each of the radio waves 16-1 to 16-4 including both the wide area broadcasting radio wave and the sub-local area broadcasting radio wave is transmitted to each sub-local area (or each sector) through each of directional antennas 106-1 to 106-4 that are incorporated corresponding to each of the sub-local area broadcastings 1 to 4, respectively. In the configuration shown in FIG. 10, the SS modulators 14-1 to 14-4 and the frequency synthesizers 15-1 to 15-4 are equal in configuration to the SS modulator 14 and the frequency synthesizer 15 shown in FIG. 5A and FIG. 7.

Figure 11:
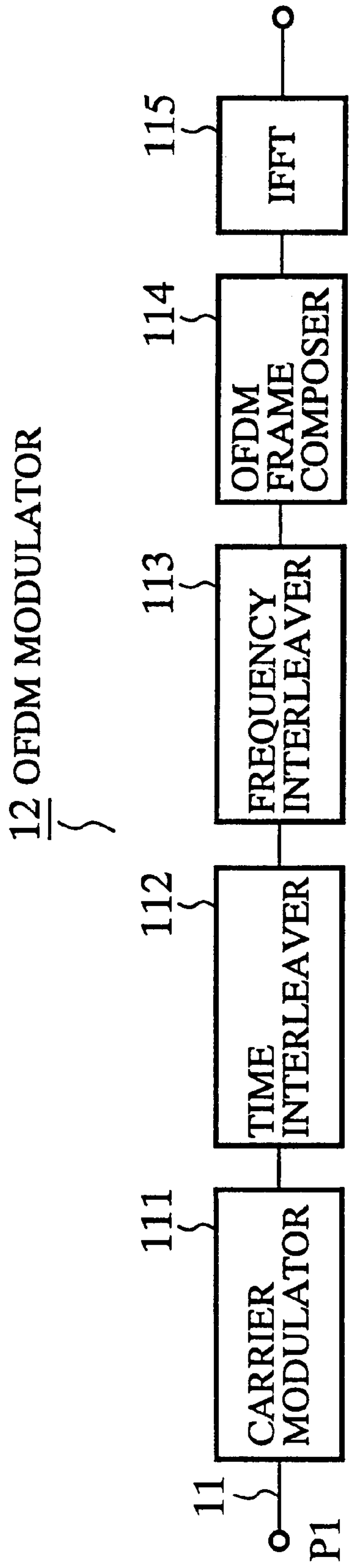
FIG. 11 is a diagram showing a configuration of an OFDM modulator incorporated in the broadcasting transmitter shown in both FIG. 5A and FIG. 10.

FIG. 11 is a diagram showing a configuration of the OFDM modulator incorporated in the broadcasting transmitter shown in both FIG. SA and FIG. 10. In FIG. 11, the reference number 111 designates a carrier modulator, the reference number 112 denotes time interleaver, the reference number 113 indicates a frequency interleaver, the reference number 114 designates an OFDM frame composer, and the reference number 115 denotes an Inverse Fast Fourier Transform Section (an IFFT section).

Figure 12:
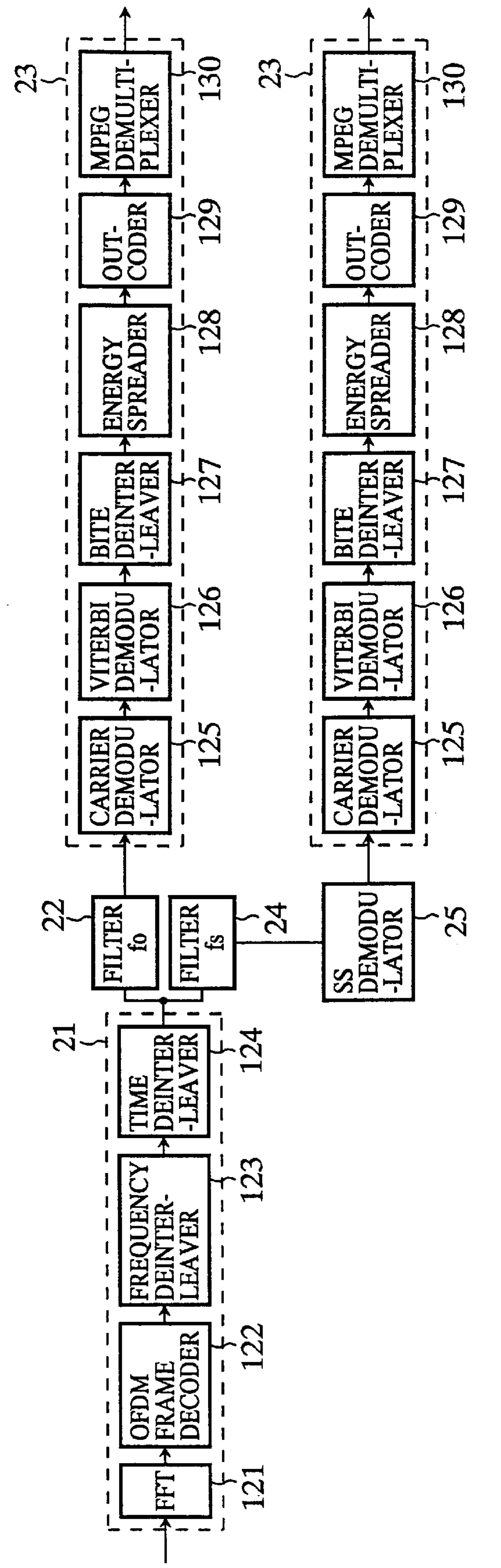
FIG. 12 is a diagram showing another configuration of the broadcasting receiver as the first embodiment according to the present invention.

FIG. 12 is a diagram showing another configuration of the broadcasting receiver as the first embodiment according to the present invention. In FIG. 12, the reference number 121 designates a Fast Fourier Transform section (FFT section), the reference number 122 indicates an OFDM frame decoder, and the reference number 123 designates a frequency deinterleaver. The frequency divider 21 comprises the FET 121, the OFDM frame decoder 122, the frequency deinterleaver 123, and the time deinterleaver 124. The reference number 125 designates a carrier demodulator, the reference number 126 denotes a viterbi demodulator, the reference number 127 indicates a byte interleaver, the reference number 128 designates an energy spreader, and the reference number 129 indicates out coder. The reference number 130 designates a MPEG de-multiplexer. The OFDM demodulator 23 comprises the carrier demodulator 125, the viterbi demodulator 126, the byte interleaver 127, the energy spreader 128, the out coder 129, and the MPEG de-multiplexer 130.

Thus, in the simultaneous broadcasting system and the broadcasting transmitter having the configuration shown in FIG. 9 and FIG. 10 operating based on this simultaneous broadcasting system, one local broadcasting area is divided into the four local sub-areas, namely four sectors such as the North area, the East area, the South area, and the West area. A wide area broadcasting program (a same program) is transmitted to the whole local broadcasting area and different sub-local broadcasting programs are transmitted to corresponding local sub-areas, namely corresponding sectors through the directional antennas 106-1 to 106-4 incorporated in the broadcasting transmitter shown in FIG. 10. In this case, this configuration of the broadcasting transmitter may be obtained without any changing of the configuration of the OFDM modulator in the broadcasting transmitter shown in FIG. 5A, and local sub-area broadcasting signals are modulated based on the spread spectrum method by using different spreading codes corresponding to the four sectors, respectively, in the same frequency bandwidth. A local sub-area broadcasting receiver located in each sector receives the same program as the wide area broadcasting and the corresponding local sub-area program through a directional antenna incorporated in the local sub-area broadcasting receiver. Each local sub-area broadcasting receiver modulates the received radio waves by using the spreading code allocated only for each local sub-area. Thus, the simultaneous broadcasting system based on the spread spectrum method according to the present invention, because different programs are transmitted to different local sub-areas or sectors by using different spreading codes for the sectors in the same frequency bandwidth, the receiver in the local sub-area broadcasting station placed at each local sub-area may receive the broadcasting programs by matching the spreading code without occurrence of radio wave frequency interference caused from adjacent local sub-area broadcasting stations located in different local sub-areas.

As described above, in the simultaneous broadcasting system according to the first embodiment of the present invention, the frequency bandwidth of 6 MHz of a broadcasting frequency channel is divided into two parts, the frequency bandwidth for the wide area broadcasting and the frequency bandwidth for the local area broadcasting, and OFDM method capable of preventing occurrence of frequency interference by radio wave signals of a same broadcasting program is adapted to the wide area broadcasting, and the SS method is adopted to the local area broadcasting by using different spreading codes for local area broadcasting stations. It is thereby possible for each different local area broadcasting station to broadcast each different program by using a small frequency bandwidth, not requiring any wide frequency bandwidth. In addition to this feature of the present invention, one local broadcasting area is further divided into a plurality of local sub-areas or sectors and a different spreading code is used for each different local sub-area broadcasting station, it is thereby possible for each local sub-area broadcasting station to broadcast a different program simultaneously without occurrence of frequency interference in adjacent sub-areas.

Second Embodiment

Figure 13:
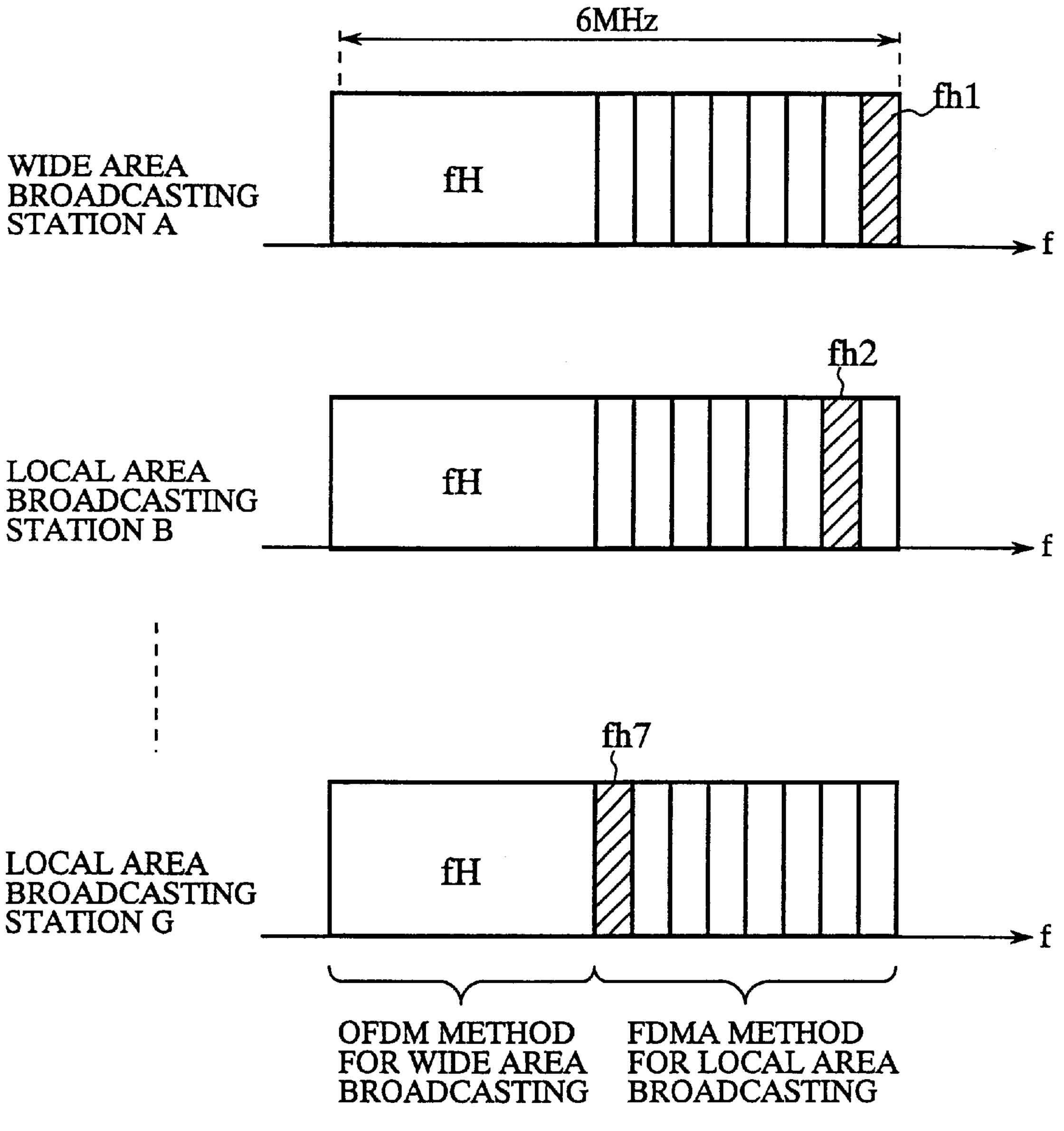
FIG. 13 is a diagram showing an allocation map (OFDM and FDMA) of the frequency band to be used in the simultaneous broadcasting system as the second embodiment according to the present invention.

FIG. 13 is diagram showing an allocation map (OFDM and FDMA) of the frequency band to be used in the simultaneous ibroadcasting system as the second embodiment according to the present invention. In the simultaneous broadcasting system of the second embodiment, one broadcasting bandwidth of a bandwidth 6 MHz is divided into two parts, one is used for the wide area broadcasting bandwidth fH and other is used for the local area broadcasting bandwidth. Further, the local area broadcasting bandwidth is divided into frequency bandwidths fh1 to fh7 for local area broadcasting stations. The wide area broadcasting station performs the modulation in this wide area broadcasting bandwidth based on the OFDM method, like the first embodiment, capable of preventing occurrence of interference in adjacent areas designated by the slant lines shown in FIG. 1 even if same broadcasting radio wave signals are transmitted. Each local broadcasting station corresponding each local area broadcasting performs the modulation in one of the frequency bandwidths fh1 to fh7 based on the Frequency Division Multiplex Access (FDMA) method. Thus, it is possible to avoid occurrence of broadcasting frequency interference in adjacent areas when one local area broadcasting uses one of the frequency bandwidths fh1 to fh7.

Figures 14A, 14B:
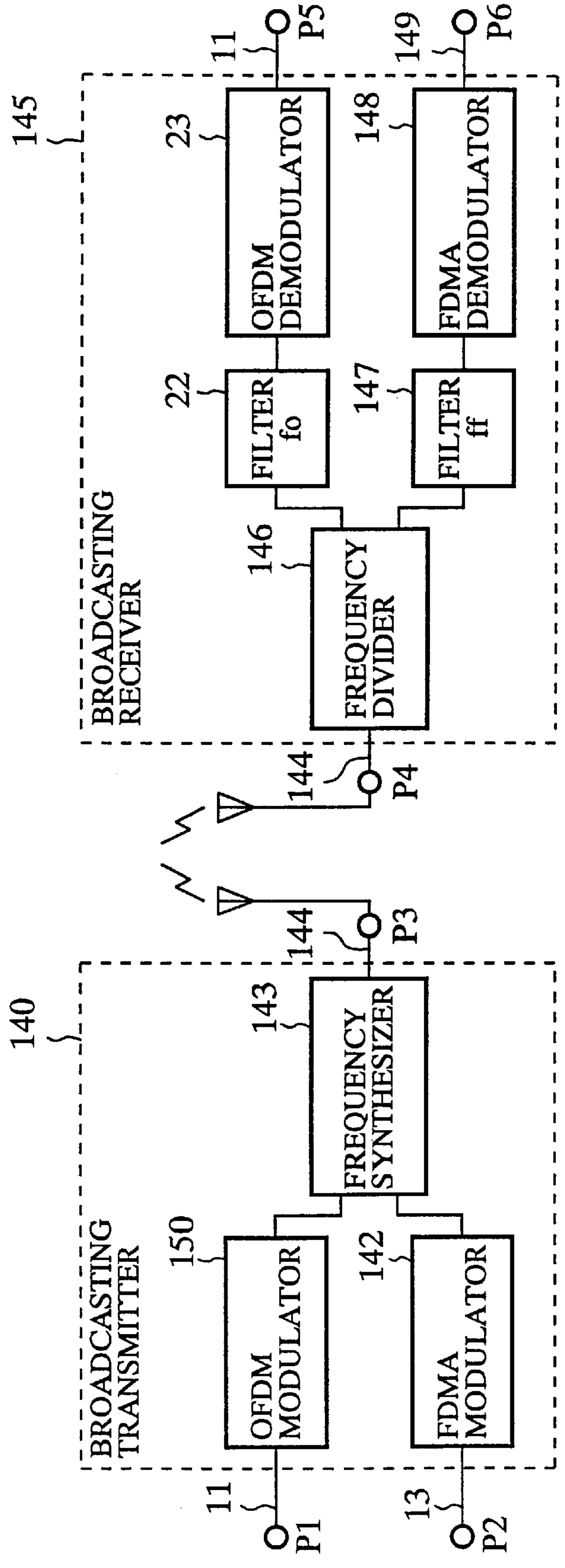
FIGS. 14A and 14B are diagrams showing a configuration of a broadcasting transmitter and a broadcasting receiver to be used in the simultaneous broadcasting system as the second embodiment according to the present invention.

FIG. 14A is a diagram showing a configuration of a broadcasting transmitter to be used in the simultaneous broadcasting system as the second embodiment according to the present invention. The broadcasting transmitter shown in FIG. 14A modulates wide area broadcasting signals based on the OFDM modulation method by using the frequency bandwidth fH and local area broadcasting signals based on the FDMA modulation method by using the frequency bandwidth fh1 in the wide area broadcasting station A, for example. In FIG. 14A, the reference number 140 designates the broadcasting transmitter, the reference character P1 denotes an input terminal through which wide area broadcasting signals 11 are received. The reference character P2 indicates an input terminal through which local area broadcasting signals 13 are received. The reference number 150 designates an OFDM (Orthogonal Frequency Division Multiplexing) modulator for modulating the wide area broadcasting signals 11. The reference number 142 indicates a Frequency Division Multiplex Access (FDMA) modulator for modulating the local area broadcasting signals 13. The reference number 143 designates a frequency synthesizer for synthesizing output from the OFDM modulator 150 and output from the FDMA modulator 142. The reference number 144 designates a broadcasting signal to be transmitted through an output terminal P3 and an antenna in the broadcasting transmitter 140.

FIG. 14B is a diagram showing a configuration of a broadcasting receiver to be used in the simultaneous broadcasting system as the second embodiment according to the present invention. The broadcasting receiver shown in FIG. 14B demodulates wide area broadcasting signals and local area broadcasting signals transmitted from the broadcasting transmitter 140. In FIG. 14B, the reference number 145 designates the broadcasting receiver for receiving the broadcasting radio wave signals transmitted from the broadcasting transmitter 140. The reference character P4 denotes an input terminal through which the broadcasting radio wave signals 144 are received. The reference number 146 indicates a frequency divider for dividing the broadcasting radio wave signals 144 into a signal component in the frequency bandwidth fo for the wide area broadcasting and a signal component in the frequency bandwidth ff for the local area in broadcasting. The reference number 22 designates a filter fo through which the signal component in the frequency bandwidth fo is passed. The reference number 147 denotes a filter ff through which the signal component in the frequency bandwidth ff is passed. The reference number 23 indicates an OFDM demodulator for demodulating the signal component in the frequency bandwidth fo for the wide area broadcasting. The reference number 148 indicates a FDMA demodulator for demodulating the signal component in the frequency bandwidth ff for the local area broadcasting. The reference character P5 designates an output terminal for the wide area broadcasting signals 11. The reference character P6 denotes an output terminal for the local area broadcasting signals 149.

Figure 15:
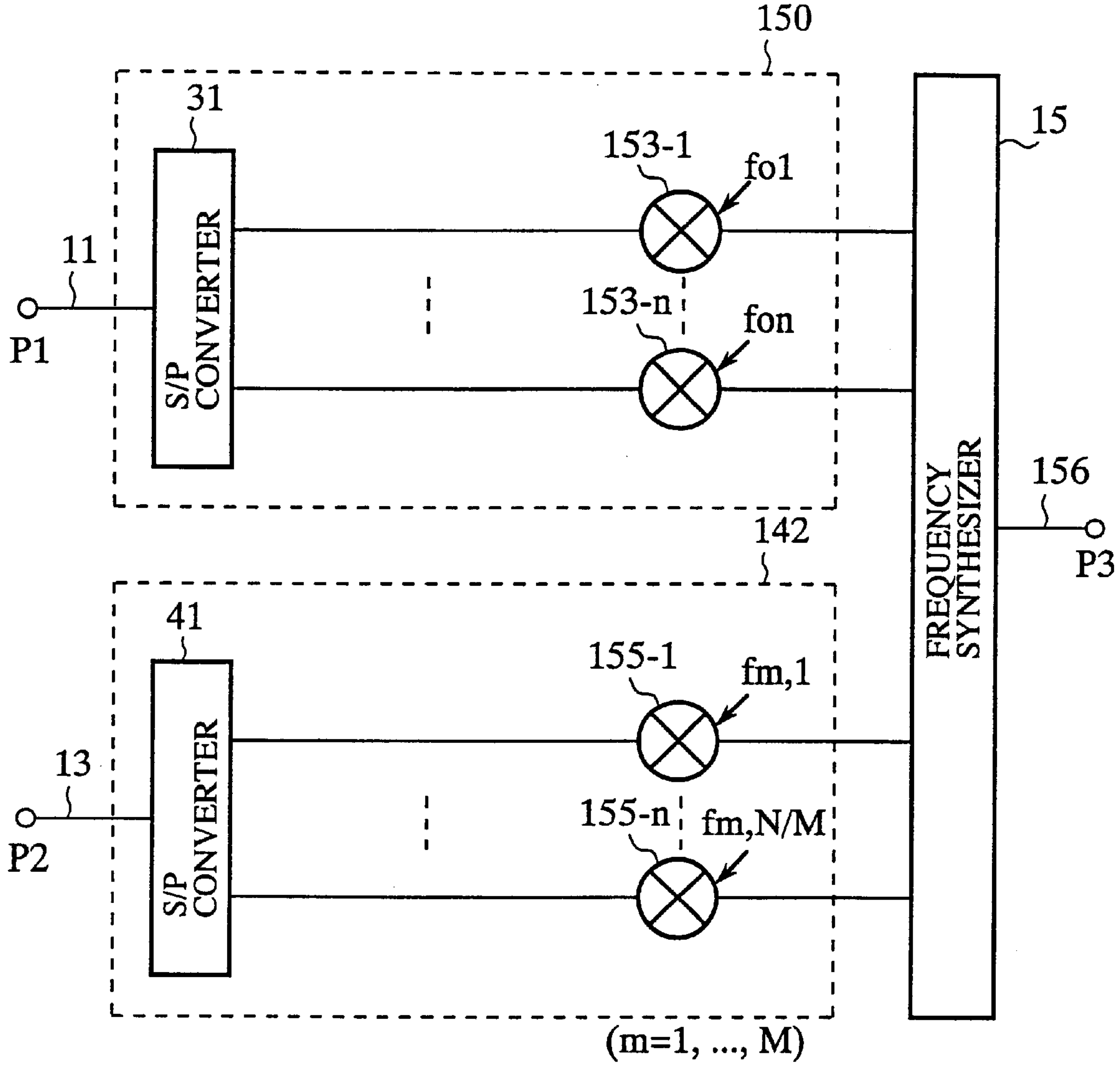
FIG. 15 is a diagram showing a detailed configuration of the broadcasting transmitter shown in FIG. 14A.

FIG. 15 is a diagram showing a detailed configuration of the broadcasting transmitter 140 shown in FIG. 14A. In FIG. 15, the reference number 31 designates a serial/parallel converter (S/P converter) for converting serial signals of the wide area broadcasting signals 11 into n parallel signals (n is a positive integer). The reference numbers 153-1, . . . , and 153-n denote frequency modulators for performing the frequency modulation by using the carrier frequencies fo1, . . . , and fon based on the OFDM modulation method. The OFDM modulator 150 comprises the S/P converter 31, and the frequency modulators 153-1, . . . , and 153-n. The reference number 41 designates a serial/parallel converter (S/P converter) for converting serial signals of the local area broadcasting signals 13 into n parallel signals (n is a positive integer). The reference numbers 155-1, . . . , and 155-n designate frequency modulators for performing the frequency modulation by using the carrier frequencies fm,1 , . . . , and fm,N/M, where m=1, . . . , and M. The FDMA modulator 142 comprises the S/P converter 41, and the frequency modulators 155-1, . . . , and 153-n. In this embodiment, when the number of 3broadcasting transmitters is M (M is a positive integer), each transmitter transmits a different local area broadcasting program, the FDMA modulator 142 incorporated in each transmitter selects different frequency coefficients a group of f(1,1), . . . , and f(1,N/M), a group of f(2,1), . . . , and f(2,N/M), . . . , and a group of f(M,1), . . . , and f(M,N/M), wherein N is a positive integer, and m=1, . . . , M.

Because the broadcasting receiver 145 may receive broadcasting signals transmitted from the broadcasting transmitter 140 and performs the reverse operation of this transmitter 140, the detailed explanation of the receiver is therefore omitted here.

Next, a description will be given of the operation of the broadcasting transmitter 140 of the second embodiment.

The wide area broadcasting station A broadcasts a wide area broadcasting program by using the frequency bandwidth fH based on the OFDM modulation method, and a local area broadcasting program by using the frequency bandwidth fh1 based on the FDMA modulation method. Further, the local area broadcasting station B broadcasts the wide area broadcasting program by using the frequency bandwidth fH based on the OFDM modulation method, and broadcasts a different local area broadcasting program by using the frequency bandwidth fh2 based on the FDMA modulation method shown in FIG. 13. The other broadcasting stations, for example, the station G, also broadcasts different local area broadcasting program like the local area broadcasting station B.

Thus, in the simultaneous broadcasting system according to the second embodiment, one broadcasting channel of a bandwidth 6 MHz is divided into two parts, one part is used for the wide area broadcasting bandwidth fH and the other part is used for the local area broadcasting bandwidth. In addition to this, the local area broadcasting bandwidth is further divided into frequency bandwidths fh1 to fh7 for local area broadcasting stations. The wide area broadcasting station performs the modulation in this wide area broadcasting bandwidth based on the OFDM method, like the first embodiment, capable of preventing occurrence of interference in adjacent areas designated by the slant lines shown in FIG. 1 even if same broadcasting radio wave signals are transmitted. Each local broadcasting station corresponding each local area broadcasting performs the modulation in one of the frequency bandwidths fh1 to fh7 based on the Frequency Division Multiplex Access (FDMA) method. Thus, it is thereby possible to avoid occurrence of broadcasting frequency interference in adjacent areas when one local area broadcasting uses one of the frequency bandwidths fh1 to fh7.

In the above example, the FDMA modulation method is used for the local area broadcasting, it is also possible to have the same effect by using a Time Division Multiplex Access (TDMA) method.

Figure 18:
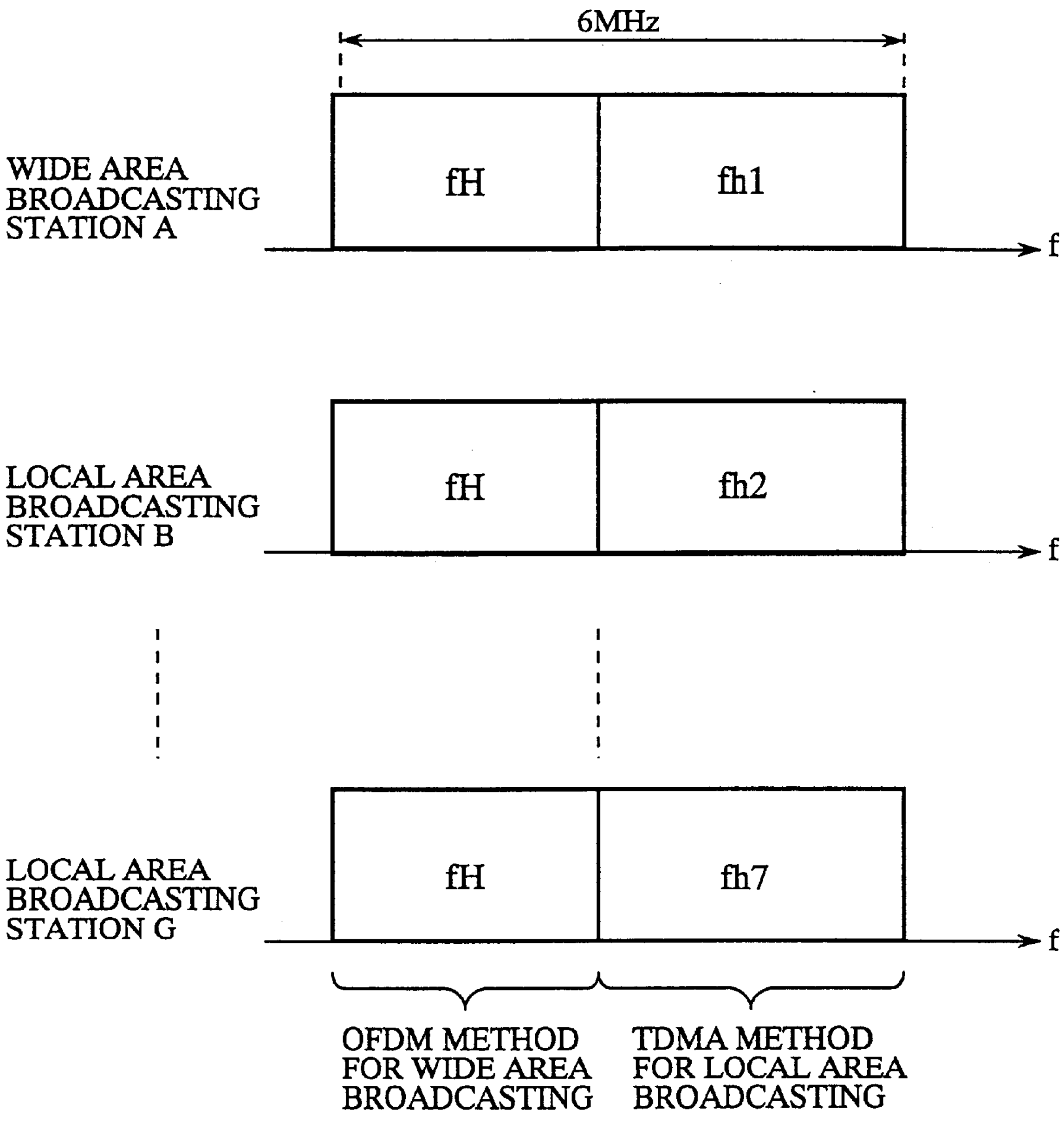
FIG. 18 is a diagram showing another allocation map (OFDM and TDMA) of the frequency band to be used in the simultaneous broadcasting system as the second embodiment according to the present invention.

FIG. 18 is a diagram showing another allocation map (OFDM and TDMA) of the frequency band to be used in the simultaneous broadcasting system as the second embodiment according to the present invention. As shown in FIG. 18, the frequency bandwidth (fh1, fh2, . . . , and fh7) for TDMA method is used for all broadcasting stations based on the time division. That is, the frequency band for TDMA is switched in time for each broadcasting station.

Figures 16A, 16B:
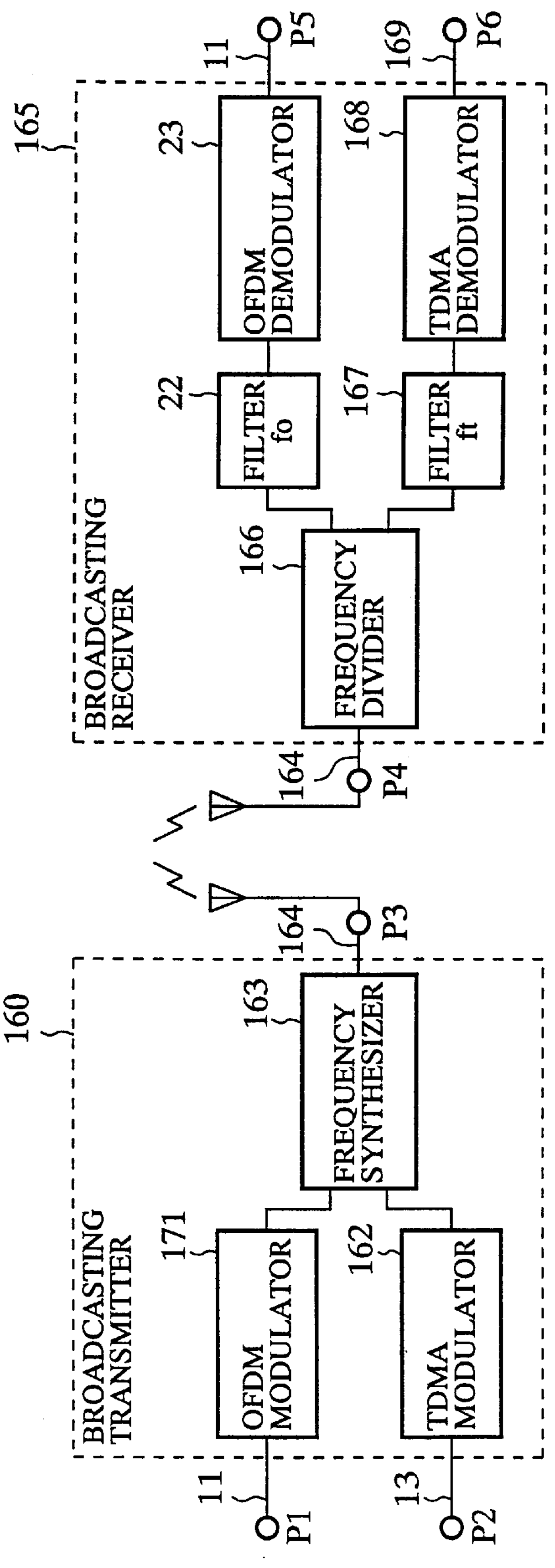
FIGS. 16A and 16B are diagrams showing another configuration of the broadcasting transmitter and the broadcasting receiver to be used in the simultaneous broadcasting system as the second embodiment according to the present invention.

FIG. 16A is a diagram showing another configuration of a broadcasting transmitter to be used in the simultaneous broadcasting system as the second embodiment according to the present invention. The broadcasting transmitter shown in FIG. 16A modulates wide area broadcasting signals based on the OFDM modulation method by using the frequency bandwidth fH and local area broadcasting signals based on the TDMA modulation method. In FIG. 16A, the reference number 160 designates the broadcasting transmitter, the reference character P1 denotes an input terminal through which wide area broadcasting signals 11 are received. The reference character P2 indicates an input terminal through which local area broadcasting signals 13 are received. The reference number 170 designates an OFDM (Orthogonal Frequency Division Multiplexing) modulator for modulating the wide area broadcasting signals 11. The reference number 162 indicates a Time Division Multiplex Access (TDMA) modulator for modulating the local area broadcasting signals 13. The reference number 163 designates a frequency synthesizer for synthesizing output from the OFDM modulator 171 and output from the TDMA modulator 162. The reference number 164 designates a broadcasting signal to be transmitted through an output terminal P3 and an antenna in the broadcasting transmitter 160.

FIG. 16B is a diagram showing a configuration of a broadcasting receiver to be used in the simultaneous broadcasting system as the second embodiment according to the present invention. The broadcasting receiver shown in FIG. 16B demodulates wide area broadcasting signals and local area broadcasting signals transmitted from the broadcasting transmitter 160. In FIG. 16B, the reference number 165 designates the broadcasting receiver for receiving the broadcasting radio wave signals 164 transmitted from the broadcasting transmitter 160 and for performing the demodulation operation for the wide area broadcasting based on the OFDM method in the frequency bandwidth fH and the demodulation operation for each local area broadcasting based on the TDMA method in the frequency bandwidth (fh1, fh2, . . . , or fh7 shown in FIG. 18). The reference character P4 denotes an input terminal through which the broadcasting radio wave signals 164 are received. The reference number 166 indicates a frequency divider for dividing the broadcasting radio wave signals 164 into a signal component in the frequency bandwidth fo for the wide area broadcasting and a signal component in the frequency bandwidth ft for the local area broadcasting. The reference number 22 designates a filter fo through which the signal component in the frequency bandwidth fo is passed. The reference number 167 denotes a filter ft through which the signal component in the frequency bandwidth ft is passed. The reference number 23 indicates an OFDM demodulator for demodulating the signal component in the frequency bandwidth fo for the wide area broadcasting. The reference number 168 indicates a TDMA demodulator for demodulating the signal component in the frequency bandwidth ft for the local area broadcasting. The reference character P5 designates an output terminal for the wide area broadcasting signals 11. The reference character P6 denotes an output terminal for the local area broadcasting signals 169.

Figure 17:
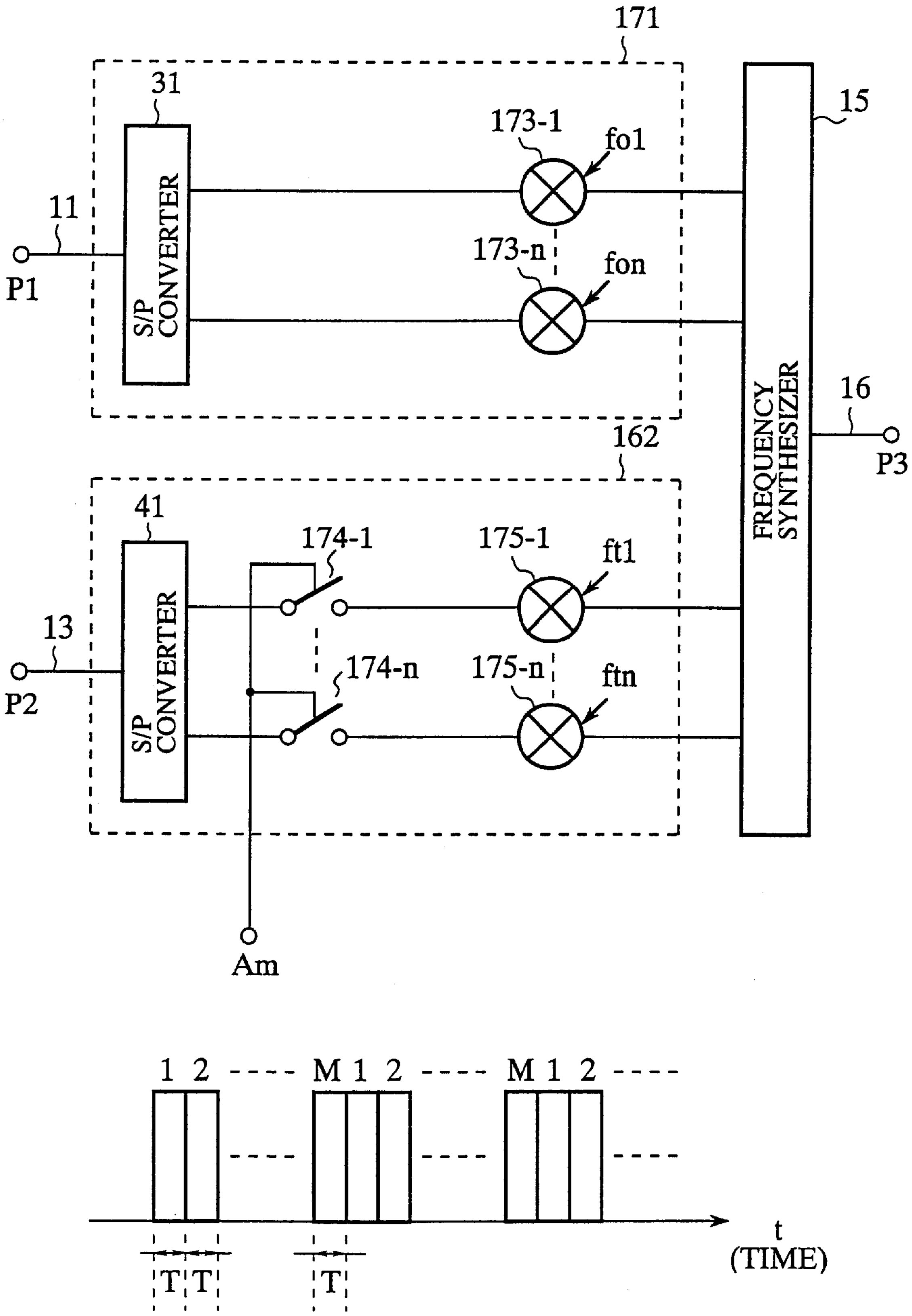
FIG. 17 is a diagram showing a detailed configuration of the broadcasting transmitter shown in FIG. 16A.

FIG. 17 is a diagram showing a detailed configuration of the broadcasting transmitter 160 shown in FIG. 16A. In FIG. 17, the reference number 31 designates a serial/parallel converter (S/P converter) for converting serial signals of the wide area broadcasting signals 11 into n parallel signals (n is a positive integer). The reference numbers 173-1, . . . , and 173-n denote frequency modulators for performing the frequency modulation by using the carrier frequencies fo1, . . . , and fon based on the OFDM modulation method. The OFDM modulator 171 comprises the S/P converter 31, and the frequency modulators 173-1, . . . , and 173-n. The reference number 41 designates a serial/parallel converter (S/P converter) for converting serial signals of the local area broadcasting signals 13 into n parallel signals (n is a positive integer). The reference numbers 175-1, . . . , and 175-n designate frequency modulators for performing the frequency modulation by using the carrier frequencies ft1 , . . . , and ftn. The TDMA modulator 162 comprises the S/P converter 41, and the frequency modulators 175-1, . . . , and 175-n. In this example, the number of broadcasting transmitters is M (M is a positive integer) and each transmitter transmits a different local area broadcasting program, a switch group Am comprises a plurality of switches in the TDMA modulator 162 incorporated in a corresponding m-th transmitter enter ON during a time interval M that is the m-th time interval in a predetermined time period, as shown in FIG. 17.

Because the broadcasting receiver 165 may receive broadcasting signals transmitted from the broadcasting transmitter 160, performs the reverse operation of the transmitter 160, and the detailed explanation of the receiver 165 is therefore omitted here.

As described above, in the simultaneous broadcasting system according to the second embodiment of the present invention, the frequency bandwidth of 6 MHz of a broadcasting channel is divided into two parts, the frequency bandwidth for the wide area broadcasting and the frequency bandwidth for the local area broadcasting, and OFDM modulation method capable of preventing occurrence of frequency interference by radio wave signals of a same broadcasting program is adapted to the wide area broadcasting, and the FDMA modulation method or the TDMA modulation method is adopted to the local area broadcasting for local area broadcasting stations. It is thereby possible for each different local area broadcasting station to broadcast each different program simultaneously by using a small frequency bandwidth, not requiring a wide frequency bandwidth.

As described above in detail, the simultaneous broadcasting system, the broadcasting transmitter, and the broadcasting receiver according to the present invention have the following features: The frequency bandwidth of 6 MHz of one broadcasting frequency channel is divided into two parts, the frequency bandwidth for the wide area broadcasting and the frequency bandwidth for the local area broadcasting; The OFDM method capable of preventing occurrence of frequency interference by radio wave signals of a same broadcasting program is adapted to the wide area broadcasting; The SS method is adopted to the local area broadcasting by using different spreading codes for local area broadcasting stations; and One local broadcasting area is further divided into a plurality of local sub-areas or sectors and a different spreading code is used per local sub-area broadcasting station. Therefore the present invention has the effect that it is possible for each local sub-area broadcasting station to broadcast a different program simultaneously without occurrence of frequency interference in adjacent sub-areas in broadcasting zones, and it is also possible for each different local area broadcasting station to broadcast each different program simultaneously by using a small frequency bandwidth, not requiring a wide frequency bandwidth.

In addition, the simultaneous broadcasting system, the broadcasting transmitter, and the broadcasting receiver according to the present invention have the following features: The frequency bandwidth of 6 MHz of one broadcasting channel is divided into two parts, the frequency bandwidth for the wide area broadcasting and the frequency bandwidth for the local area broadcasting; The OFDM method capable of preventing occurrence of frequency interference by radio wave signals of a same broadcasting program is adapted to the wide area broadcasting; The FDMA modulation method or the TDMA modulation method is adopted to the local area broadcasting for local area broadcasting stations. Accordingly, the present invention has the effect that it is possible for each different local area broadcasting station to broadcast each different program simultaneously by using a small frequency bandwidth, not requiring a wide frequency bandwidth.

While the above provides a full and complete disclosure of the preferred embodiments of the present invention, various modifications, alternate constructions and equivalents may be employed without departing from the scope of the invention. Therefore the above description and illustration should not be construed as limiting the scope of the invention, which is defined by the appended claims.

What is claimed is:

1. A simultaneous broadcasting system in which a plurality of broadcasting stations broadcast a same program as a wide area broadcasting and each of said broadcasting stations broadcasts a different program as a local area broadcasting by using one broadcasting channel, simultaneously, said simultaneous broadcasting system comprises:

- dividing a frequency bandwidth of said broadcasting channel into a first frequency bandwidth for said wide area broadcasting and a second frequency bandwidth for said local area broadcasting; and
- modulating signals of said same program for said wide area broadcasting in said first frequency bandwidth based on an Orthogonal Frequency Division Multiplex (OFDM) method, and signals of said different program in said second frequency bandwidth based on a Spread Spectrum (SS) method by using different spreading codes corresponding to said local area broadcasting stations.

2. A simultaneous broadcasting system as claimed in claim 1, wherein said second frequency bandwidth for said local area broadcasting is used for data transmission transmitted from each of said plurality of broadcasting stations.

3. A simultaneous broadcasting system as claimed in claim 1, wherein a different spreading code is allocated for each user contracted with each station of said plurality of broadcasting stations, and said second frequency bandwidth for said local area broadcasting is used for a down link in a two-way communication between said each broadcasting and said each user.

4. A simultaneous broadcasting system as claimed in claim 1, wherein a broadcasting area of each of at least one or more said broadcasting stations is divided into a plurality of sectors, and each broadcasting station broadcasts different programs to each sector by using different spreading codes corresponding to each sector based on said SS method.

5. A simultaneous broadcasting system as claimed in claim 1, wherein said second frequency bandwidth allocated for said local area broadcasting is further divided into a plurality of sub-frequency bandwidth, and each broadcasting station broadcasts a different local area broadcasting program based on a Frequency Division Multiple Access (FDMA) method in each of said plurality of sub-frequency bandwidth allocated for each broadcasting station.

6. A simultaneous broadcasting system as claimed in claim 1, wherein said second frequency bandwidth allocated for said local area broadcasting is further divided based on a Time Division Multiplex Access (TDMA), and each broadcasting station broadcasts a different local area broadcasting program based on said TDMA method.

7. A broadcasting transmitter for transmitting a same program as a wide area broadcasting from a plurality of broadcasting stations and a different program as a local area broadcasting from one of said plurality of broadcasting stations by using one broadcasting channel, simultaneously, comprising:

an Orthogonal Frequency Division Multiplex (OFDM) modulator for modulating broadcasting signals, based on a OFDM modulation method, for said wide area broadcasting in a first frequency bandwidth obtained by dividing a frequency bandwidth of said broadcasting channel;

a Spread Spectrum (SS) modulator for modulating signals for said local area broadcasting by using a different spreading code allocated corresponding to each of said broadcasting stations based on a SS modulation method in a second frequency bandwidth obtained by dividing said frequency bandwidth of said broadcasting channel; and a frequency synthesizer for synthesizing signals from said OFDM modulator and signals from said SS modulator and for outputting synthesized signals.

8. A broadcasting transmitter as claimed in claim 7, wherein said SS modulator comprises a plurality of SS modulators for modulating said signals for said local area broadcasting, said frequency synthesizer, for synthesizing said signals from said wide area broadcasting and said signal from said local area broadcasting corresponding to each broadcasting station, comprises a plurality of frequency synthesizer, each frequency synthesizer is formed corresponding to each of said plurality of SS modulators, and further comprises a plurality of directional antennas, and wherein each directional antenna corresponds to a pair of each SS modulator and each frequency synthesizer.

9. A broadcasting transmitter as claimed in claim 7, wherein a Frequency Division Multiple Access (FDMA) modulator is incorporated instead of said SS modulator, wherein said OFDM modulator modulates said signals for said local area broadcasting by using one of a plurality of sub-broadcasting frequency bandwidths obtained by dividing said second frequency bandwidth allocated for each of said plurality of broadcasting stations.

10. A broadcasting transmitter as claimed in claim 7, wherein a Time Division Multiple Access (TDMA) modulator is incorporated instead of said SS modulator, wherein said TDMA modulator modulates said signals for said local area broadcasting based on a Time Division Multiple Access (TDMA) method in said second frequency bandwidth.

11. A broadcasting receiver for receiving a same program as a wide area broadcasting from a plurality of broadcasting stations and a different program as a local area broadcasting from one of said plurality of broadcasting stations by using one broadcasting channel, simultaneously, comprising:

a frequency divider for dividing broadcasting signals of said wide area broadcasting and said local area broadcasting transmitted through said broadcasting channel into signals on a first frequency bandwidth and a second frequency bandwidth;

an Orthogonal Frequency Division Multiplex (OFDM) demodulator for demodulating said signals on said first frequency bandwidth based on a OFDM demodulation method; and a Spread Spectrum (SS) demodulator for demodulating said signals on said second frequency bandwidth by using a different spreading code allocated corresponding to each of said plurality of broadcasting stations based on a SS demodulation method.

12. A broadcasting receiver as claimed in claim 11, wherein a Frequency Division Multiple Access (FDMA) demodulator is incorporated instead of said SS demodulator, wherein said OFDM demodulator demodulates said signals for said local area broadcasting by using one of a plurality of sub-broadcasting frequency bandwidths obtained by dividing said second frequency bandwidth allocated for each of said plurality of broadcasting stations.

13. A broadcasting transmitter as claimed in claim 11, wherein a Time Division Multiple Access (TDMA) demodulator is incorporated instead of said SS demodulator, wherein said TDMA demodulator demodulates said signals for said local area broadcasting based on a Time Division Multiple Access (TDMA) method in said second frequency bandwidth.

* * * * *